(12) United States Patent
Montemayor et al.

(10) Patent No.: US 7,581,005 B2
(45) Date of Patent: Aug. 25, 2009

(54) SYSTEMS AND METHODS FOR PRESERVING TRANSPORT LAYER PROTOCOL OPTIONS

(75) Inventors: Karl Montemayor, Santa Clara, CA (US); Robert Rodriquez, San Jose, CA (US); Allen Samuels, San Jose, CA (US); Zubin Dittia, San Mateo, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 390 days.

(21) Appl. No.: 11/627,707

(22) Filed: Jan. 26, 2007

(65) Prior Publication Data
US 2007/0239886 A1 Oct. 11, 2007

(51) Int. Cl.
*G06F 15/16* (2006.01)
(52) U.S. Cl. .................. 709/225; 709/232; 709/203; 709/224; 709/238; 370/468; 370/252; 370/389; 370/422
(58) Field of Classification Search ........... 709/225, 709/238, 232, 203, 224
See application file for complete search history.

(56) References Cited

U.S. PATENT DOCUMENTS

| | | | |
|---|---|---|---|
| 5,933,412 A | 8/1999 | Choudhury et al. |
| 6,101,543 A | 8/2000 | Alden et al. |
| 6,147,986 A | 11/2000 | Orsic |
| 6,236,643 B1 | 5/2001 | Kerstein |
| 6,253,326 B1 | 6/2001 | Lincke et al. |
| 6,314,406 B1 | 11/2001 | O'Hagan et al. |
| 6,343,318 B1 | 1/2002 | Hawkins et al. |
| 6,397,259 B1 | 5/2002 | Lincke et al. |
| 6,411,986 B1 | 6/2002 | Susai et al. |
| 6,452,915 B1 | 9/2002 | Jorgensen |
| 6,487,598 B1 | 11/2002 | Valencia |

(Continued)

FOREIGN PATENT DOCUMENTS

EP 0493286 7/1992

(Continued)

OTHER PUBLICATIONS

IETF, Transmission Control Protocol, Darpa Internet Program Protocol Specification, Sep. 1, 1981.

(Continued)

*Primary Examiner*—Jude J Jean Gilles
(74) *Attorney, Agent, or Firm*—Choate Hall & Stewart, LLP; John D. Lanza; Christopher J. McKenna

(57) ABSTRACT

The solution of the present invention provides systems and methods for preserving transport layer header options traversing network devices that terminate transport layer connections. The solution described herein provides a bi-directional intelligent proxying system by which a proxy client exchanges transport layer option information with a proxy server via an application layer protocol. The proxy server, which may be in the form of an appliance, re-injects the transport layer options received from the client into the appropriate network packets communicated on the intended network. Likewise, the proxying appliance can inform the proxy client of transport layer options received from the network, such as via a server. With this solution, devices that transmit control information, exchange communications or other functionality via transport layer options may continue to operate in conjunction with transport layer terminating devices.

51 Claims, 14 Drawing Sheets

U.S. PATENT DOCUMENTS

| | | | |
|---|---|---|---|
| 6,539,429 | B2 | 3/2003 | Rakavy et al. |
| 6,590,588 | B2 | 7/2003 | Lincke et al. |
| 6,595,417 | B2 | 7/2003 | O'Hagan et al. |
| 6,611,522 | B1 | 8/2003 | Zheng et al. |
| 6,640,248 | B1 | 10/2003 | Jorgensen |
| 6,751,673 | B2 | 6/2004 | Shaw |
| 6,880,086 | B2 | 4/2005 | Kidder et al. |
| 6,888,927 | B1 | 5/2005 | Cruickshank et al. |
| 6,954,801 | B1 | 10/2005 | Housel |
| 6,970,552 | B1 | 11/2005 | Hahn et al. |
| 6,981,180 | B1 | 12/2005 | Bailey et al. |
| 7,000,031 | B2 | 2/2006 | Fischer et al. |
| 7,016,973 | B1 * | 3/2006 | Sibal et al. .................. 709/238 |
| 7,025,209 | B2 | 4/2006 | Hawkins |
| 7,027,975 | B1 | 4/2006 | Pazandak et al. |
| 7,143,153 | B1 | 11/2006 | Black et al. |
| 7,200,153 | B2 | 4/2007 | Feuerstraeter et al. |
| 7,225,244 | B2 | 5/2007 | Reynolds et al. |
| 7,227,872 | B1 | 6/2007 | Biswas et al. |
| 7,280,547 | B2 | 10/2007 | Featherston et al. |
| 2001/0030970 | A1 | 10/2001 | Wiryaman et al. |
| 2002/0010866 | A1 | 1/2002 | McCullough et al. |
| 2002/0016851 | A1 | 2/2002 | Border |
| 2002/0034173 | A1 | 3/2002 | Border et al. |
| 2002/0035683 | A1 | 3/2002 | Kaashoek et al. |
| 2002/0147822 | A1 | 10/2002 | Susai et al. |
| 2003/0026241 | A1 | 2/2003 | Ono et al. |
| 2003/0112809 | A1 | 6/2003 | Bharali et al. |
| 2003/0123481 | A1 | 7/2003 | Neale et al. |
| 2004/0250124 | A1 | 12/2004 | Chesla et al. |
| 2005/0135250 | A1 | 6/2005 | Singh et al. |
| 2005/0144186 | A1 | 6/2005 | Hesselink et al. |
| 2005/0149481 | A1 | 7/2005 | Hesselink et al. |
| 2005/0232161 | A1 | 10/2005 | Maufer et al. |
| 2006/0126616 | A1 | 6/2006 | Bhatia |
| 2007/0160063 | A1 | 7/2007 | Mynam et al. |

FOREIGN PATENT DOCUMENTS

| | | |
|---|---|---|
| WO | WO-00/35163 | 6/2000 |

OTHER PUBLICATIONS

Jacobson et. al., "TCP Extensions for High Performance", May 1, 1992.
Border, J. et al, PILC: Performance Enhancing Proxies (PEPs), 46th IETF, Nov. 10, 1999, p. 1-17.
Spatcheck, O. et al., "Optimizing TCP Forwarder Performance", IEEE/ACM Transactions on Networking, Apr. 1, 2000.
Border J. et al., "Performance Enhancing Proxies Intended to Mitigate Link-Related Degradations", Jun. 1, 2001.
Ehsan, N. et al., "Evaluation of Performance Enhancing Proxies in Internet Over Satellite," International Journal of Communication Systems, Sep. 17, 2002, 22 pages.
Davison, B. et al., "A Split Stack Approach to Mobility-Providing Performance-Enhancing Proxies," Lehigh University, Nov. 2002, pp. 1-13, Bethlehem PA.
International Search Report for PCT/US04/24655, mailed on Jun. 21, 2005.
Written Opinion of the ISA for PCT/US04/24655, mailed on Jun. 21, 2005.
Yamanegi K. et al., "Implementation Experiments of the TCP Proxy Mechanism", Nov. 9, 2005.
International Preliminary Report on Patentability, PCT/US2004/024655, Feb. 9, 2006, 7 pages.
Vangala, S. et al., "Performance of TCP Over Wireless Networks With the Snoop Protocol," University of South Florida, 2 pages, Tampa, FL.
International Search Report for PCT/US2008/051993, mailed on Oct. 1, 2008.
Written Opinion of the ISA for PCT/US2008/051993, mailed on Oct. 1, 2008.
International Search Report for PCT/US08/56528 mailed Oct. 10, 2008.
Written Opinion for PCT/US08/56528 mailed Oct. 10, 2008.
Office Action for U.S. Appl. No. 11/301,825 dated Aug. 26, 2008.

* cited by examiner

SYSTEMS AND METHODS FOR PRESERVING TRANSPORT LAYER PROTOCOL OPTIONS

RELATED APPLICATIONS

This present application claims priority to U.S. patent application Ser. No. 11/301,825 entitled "AUTOMATIC LAN/WAN PORT DETECTION", filed Dec. 12, 2005, which claims priority to U.S. Provisional Patent Application No. 60/645,846, entitled "AUTOMATIC LAN/WAN PORT DETECTION", filed Jan. 20, 2005, both of which are incorporated herein by reference.

FIELD OF THE INVENTION

The present invention generally relates to data communication networks and, in particular, to systems and methods for preserving a transport control protocol header option traversing a transport control protocol terminating device.

BACKGROUND OF THE INVENTION

In a network environment, devices, such as a client and server, may communicate via a transport layer connection. In a TCP/IP network, a client and server may establish a transport control protocol (TCP) connection and communicate by transmitting TCP packets. With TCP, the client and server may exchange transport control protocol information by optional information in headers of TCP packets referred to as TCP header options. For example, a client and server may negotiate the internet protocol segment size by using the maximum segment size option field in a TCP synchronization packet known as a TCP SYN packet. In another example, the client and server may use a TCP packet selective acknowledgement mechanism implemented with TCP header options to communicate which packets have been received. In other examples, devices may exchange proprietary control information using TCP header options.

One problem with using TCP header options is that a device between two communicating end points may terminate the transport layer connection or otherwise remove TCP header options. For example, a client and server may communicate over TCP via an intermediate device, such as a firewall. In one case, the intermediate device may terminate a first TCP connection with the client and establish a second TCP connection with the server on behalf of the client. TCP header options exchanged between the client and server may be consumed by the intermediate device. If a client communicates TCP header options to the server, the intermediate device may consume those options. As a result, the server does not receive the client set TCP options via the second connection. Likewise, if the server communicates TCP header options to the client, the intermediate device may consume the TCP options and not communicate them via the first connection to the client. In another case, the intermediate device may not recognize a field of the TCP header option. For example, the intermediate device may be a firewall that detects unknown or certain TCP header options as a security risk. In response, the firewall may discard or reject these TCP packets.

Thus, it is desirable to provide systems and methods to preserve transport layer protocol options communicated via network equipment terminating transport layer connections.

BRIEF SUMMARY OF THE INVENTION

The solution of the present invention provides systems and methods for preserving transport layer header options traversing network devices that terminate transport layer connections. The solution described herein provides a bi-directional intelligent proxying system by which a proxy client exchanges transport layer option information with a proxy server via an application layer protocol. The proxy server, which may be in the form of an appliance, re-injects the transport layer options received from the client into the appropriate network packets communicated on the intended network. Likewise, the proxying appliance can inform the proxy client of transport layer options received from the network, such as via a server. With this solution, devices that transmit control information, exchange communications or other functionality via transport layer options may continue to operate in conjunction with transport layer terminating devices.

In one aspect, the present invention relates to a method for maintaining by a transport control protocol terminating appliance a header option of a transport control protocol connection request communicated between a client and a server via the transport control protocol terminating appliance and a second appliance. The second appliance identifies via the header option a type of network connection or speed of a port of the second appliance. The method includes receiving, by a first appliance, a first request from a client to establish a transport control protocol connection to a server. The first request identifies a transport control protocol header option. The first appliance terminates a first transport protocol control connection with the client. The method further includes the first appliance identifying a transport control protocol header option of the first request, and transmitting in response to the first request a second request to establish the transport control connection to the server. The first appliance provides in the second request the identified transport control protocol header option of the first request. A second appliance identifies the transport control header option of the second request received on a port of the second appliance, and determines a type of network connection of the port in response to identifying the transport control header option.

In some embodiments, the second appliance determines the port is connected to a Wide Area Network (WAN). In other embodiments, the second appliance determines the port is connected to a client or a third appliance providing one or more Wide Area Network (WAN) optimization techniques. In one embodiment, the method includes the second appliance processing network packets communicated via the port based on the identified type of network connection. In some embodiments, the second appliance performs a Wide Area Network (WAN) optimization operation on the network packets. In another embodiment, the second appliance identifies via the transport control protocol option that the client is configured to perform one of compression or data flow acceleration. In some embodiments, the second appliance transmits the second request to the server. In response to receiving the second request, the server may establish a second transport control protocol connection.

In some embodiments, the method includes the client transmitting the first request via an application layer protocol. In one embodiment, a network capture mechanism of the client intercepts the transport control protocol connection request of an application. The transport control connection request may have a transport protocol control header option. In some embodiments, the method includes transmitting, by the network capture mechanism, a request to an agent of the client to establish the transport control protocol connection with the server. The agent may then transmit the first request to the appliance.

In yet other embodiments, the method includes intercepting, by a network filter, on the client a network packet comprising a transport control protocol connection request of the application, and inserting the transport control protocol header option into the network packet. In some embodiments, the second appliance transmits to the first appliance a second transport control protocol header option in response to establishing the second transport control protocol connection. The first appliance may extract the second transport control protocol header option from the response transmitted by the second appliance. The first appliance then transmits the second transport control protocol header option to the client in response to the client's request to establish the transport control protocol connection with the server. In some embodiments, the first appliance includes any one of the following devices: 1) an application firewall, 2) a Secure Socket Layer Virtual Private Network device, or 3) a network acceleration device or application acceleration device. In one embodiment, the second appliance comprises a Wide Area Network optimization controller or a Wide Area Network acceleration device.

In another aspect, the present invention relates to a method for maintaining by a client a header option of a transport control protocol connection request communicated from a client to a server via a transport control protocol terminating appliance. The method includes intercepting, by a network packet capture mechanism on a client, a first network packet of an application requesting to establish a transport control protocol connection to a server. The first network packet includes a first transport control protocol header option. The method also includes communicating, by the network packet capture mechanism, the first transport control protocol header option to a secure access proxy on the client and the secure access proxy transmitting to an appliance a request to connect to the server. The request identifies the first transport control protocol header option. The appliance may terminate a first transport protocol control connection with the client. The method also includes storing, by the secure access proxy, a second transport control protocol header option received from the appliance in establishing a second transport control protocol connection with the server, and providing, by the network packet capture mechanism, to the application a second network packet that includes a response to the application's request to establish the transport control protocol connection to a server. The second network packet includes the second transport control protocol header option.

In some embodiments, the method includes intercepting, by a network filter, the first network packet of the application, and adding the first transport control protocol header option to the network packet. In one embodiment, the client transmits the first transport control protocol header option to identify that the client is connecting to the server via a Wide Area Network (WAN) connection. In other embodiments, the client transmits the first transport control protocol header option to announce presence of the client to a Wide Area Network (WAN) appliance. In another embodiment, the client transmits the first transport control protocol header option to identify to a Wide Area Network (WAN) appliance that the client is configured to provide compression or data flow acceleration. In some embodiments, the method includes transmitting, by the secure access proxy, the request to connect to the server via an application layer protocol. In one embodiment, the network packet capture mechanism communicates to the secure access gateway via a user datagram protocol. In some cases, the secure access gateway listens on a local user datagram protocol port for communications from the network packet capture mechanism. In one embodiment, the network packet capture mechanism stores the first transport control protocol header option in a storage element.

In some embodiments, the network packet capture mechanism operates in a kernel portion of an operating system of the client. In other embodiments, the secure access proxy operates in a user space portion of an operating system of the client. In some embodiments, the second appliance is a Wide Area Network optimization controller or a Wide Area Network acceleration device. In other embodiments, the appliance may be one of the following: 1) an application firewall, 2) a Secure Socket Layer Virtual Private Network device, or 3) a network acceleration device or application acceleration device. In yet some embodiments, the network packet capture mechanism, the secure access proxy or a network filter may provide compression or data flow acceleration across a Wide Area Network.

In one embodiment, the method includes transmitting, by the appliance, a second request to establish the transport control protocol connection with the server using the first transport control protocol header option. The second request may traverse a second appliance. The second appliance may identify via the first transport control protocol header option that a port of the second appliance used by the client is connected to a Wide Area Network (WAN). In some embodiments, the second appliance identifies via the first transport control protocol header option that the client includes compression and/or data flow acceleration capabilities. In other embodiments, the method also includes transmitting, by the second appliance, to the appliance the second transport control protocol header option in response to establishing the second transport control protocol connection to the server. The appliance may extract the second transport control protocol header option from the response, and transmit the second transport control protocol header option to the client in response to the client's request to establish a transport control protocol connection with the server.

In yet another aspect, the present invention relates to a system for maintaining by a transport control protocol terminating appliance a header option of a transport control protocol connection request communicated between a client and a server via the transport control protocol terminating appliance and a second appliance. The second appliance identifies via the header option a type of network connection of a port of the second appliance. The system includes a client transmitting a first request to establish a transport control protocol connection to a server. The first request identifies a transport control protocol header option. The first appliance receives the first request from the client and terminates a first transport protocol control connection with the client. The first appliance identifies the transport control protocol header option of the first request. In response to the first request, the first appliance transmits to the server a second request to establish the transport control connection using the identified transport control protocol header option. A second appliance identifies the transport control header option of the second request received on a port of the second appliance, and determines a type of network connection of the port in response to identifying the transport control header option.

In some embodiments of the system, the second appliance determines the port is connected to a Wide Area Network (WAN). In another embodiment, the second appliance determines the port is connected to a client or a third appliance providing one or more Wide Area Network (WAN) optimization techniques. In other embodiments, the second appliance processes network packets communicated via the port based on the identified type of network connection. The second appliance may perform a Wide Area Network (WAN) optimization operation on the network packets. In one embodiment, the second appliance determines via the transport control protocol option that the client includes a capability of compression and/or data flow acceleration.

In another embodiment of the system, the client transmits the first request via an application layer protocol. In one embodiment, a network capture mechanism of the client intercepts the transport control protocol connection request of an application. The transport control connection request may have the transport protocol control header option. In some embodiments, the network capture mechanism transmits a request to an agent of the client to establish the transport control protocol connection with the server. In turn, the agent may transmit the first request to the appliance. In one embodiment, a network filter intercepts on the client a network packet having a transport control protocol connection request of the application, and inserts the transport control protocol header option into the network packet.

In some embodiments, the system includes the second appliance transmitting to the first appliance a second transport control protocol header option in establishing the second transport control protocol connection. In one embodiment, the first appliance extracts the second transport control protocol header option and transmits the second transport control protocol header option to the client in response to the client's request to establish a transport control protocol connection with the server. The first appliance may include one of the following: 1) an application firewall, 2) a Secure Socket Layer Virtual Private Network device, or 3) a network acceleration device or application acceleration device. The second appliance may include a Wide Area Network optimization controller or a Wide Area Network acceleration device.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

In the drawings, like reference numbers generally indicate identical, functionally similar, and/or structurally similar elements.

DETAILED DESCRIPTION OF THE INVENTION

For purposes of reading the description of the various embodiments of the present invention described below, the following descriptions of the sections of the specification and their respective contents may be helpful:

Section A describes a network environment and computing environment useful for practicing an embodiment of the present invention;

Section B describes embodiments of a system environment and client architecture;

Section C describes embodiments of systems and methods for using transport layer protocol options for automatic WAN/LAN detection;

Section D describes embodiments of systems and methods for preserving transport layer protocol options communicated via transport layer protocol terminating appliances; and Section E describes embodiments of systems and methods for using Internet Protocol (IP) options for announcing a presence, functionality or capability of a device.

A. Network and Computing Environment

Prior to discussing the specifics of embodiments of the systems and methods of an appliance and/or client, it may be helpful to discuss the network and computing environments in which such embodiments may be deployed.

Figure 1A:
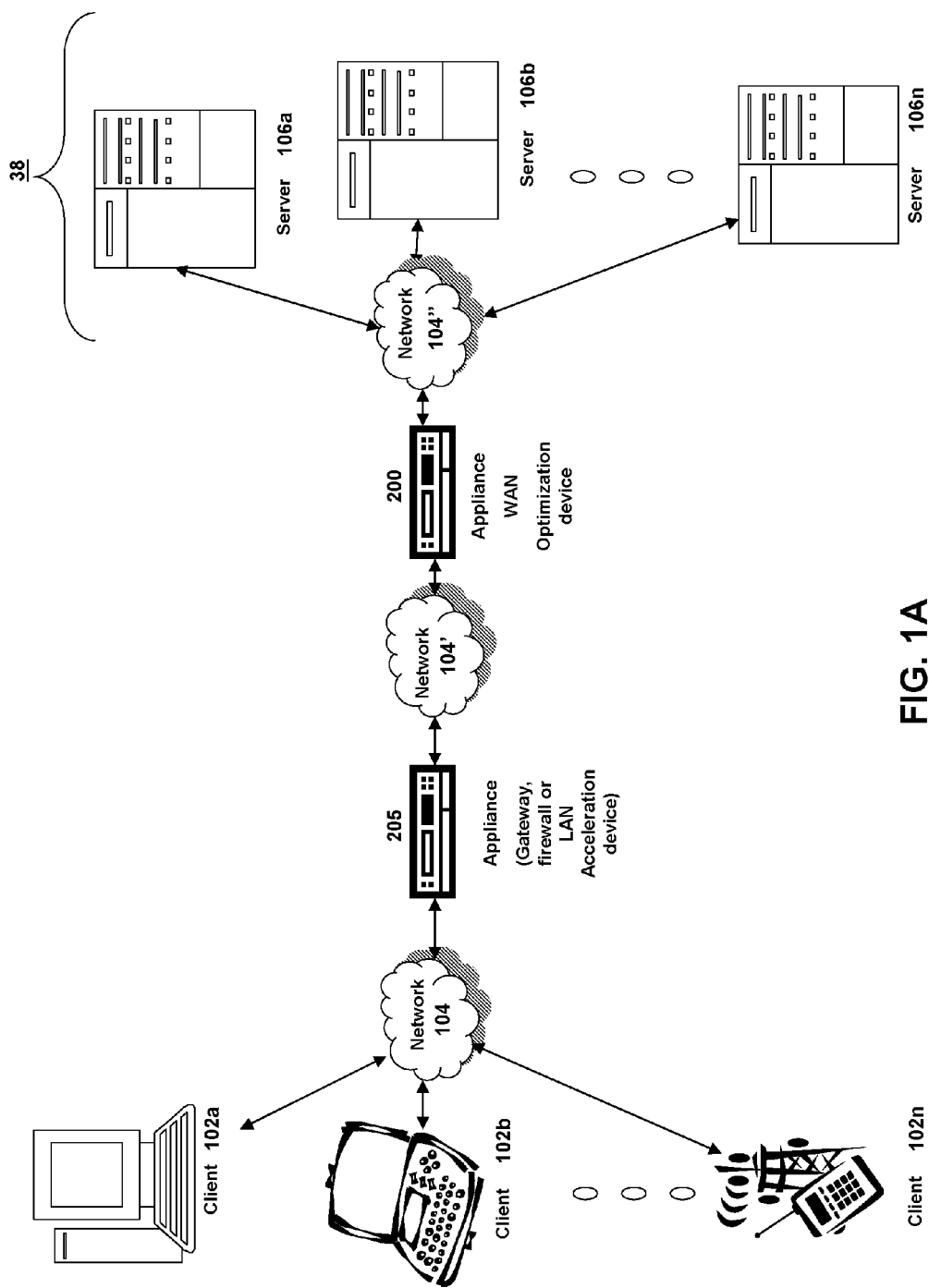
FIG. 1A is a block diagram of an embodiment of a network environment for a client to access a server via one or more appliances.

Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104', 104". In some embodiments, one or more of the clients 102 communicates with any of the servers 106 via one or more appliances, such as appliance 205 and appliance 200. In some embodiments, the appliance 200 is a Wide Area Network (WAN) optimization controller or appliance, and the appliance 205 is a transport control protocol terminating device, such as a firewall.

Although FIG. 1A shows a network 104, network 104' and network 104" (generally referred to as network(s) 104) between the clients 102 and the servers 106, the clients 102 and the servers 106 may be on the same network 104. The networks 104, 104', 104" can be the same type of network or different types of networks. The network 104 can be a local-area network (LAN), such as a company Intranet, a metropolitan area network (MAN), or a wide area network (WAN), such as the Internet or the World Wide Web. The networks 104, 104', 104" can be a private or public network. In one embodiment, network 104' or network 104" may be a private network and network 104 may be a public network. In some embodiments, network 104 may be a private network and network 104' and/or network 104" a public network. In another embodiment, networks 104, 104', 104" may be private networks. In some embodiments, clients 102 may be located at a branch office of a corporate enterprise communicating via a WAN connection over the network 104 to the servers 106 located on a corporate LAN in a corporate data center.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

As shown in FIG. 1A, a first appliance 205, which also may be referred to as an interface unit, gateway, or network device, is shown between the networks 104 and 104'. In some embodiments, the appliance 205 may be located on network 104. For example, a branch office of a corporate enterprise may deploy an appliance 205 at the branch office. In other embodiments, the appliance 205 may be located on network 104'. For example, an appliance 205 may be located at a corporate data center.

A second appliance 200 is also shown in between the networks 104 and 104'. In one embodiment, a first appliance 205 communicates with a second appliance 200. In some embodiments, the appliance 200 may be located on network 104. In other embodiments, the appliance 200 may be located on network 104. In one embodiment, the appliance 205 is on the same network as appliance 200. In another embodiment, the appliance 205 is on a different network as appliance 200. In yet another embodiment, a plurality of appliances 200 and 205 may be deployed on network 104. In some embodiments, a plurality of appliances 200 and 205 may be deployed on network 104'. In other embodiments, the appliance 200 or 205 could be a part of any client 102 or server 106 on the same or different network 104, 104' as the client 102. One or more appliances 200 and 205 may be located at any point in the network or network communications path between a client 102 and a server 106.

A first appliance 205 may include any type and form of transport control protocol or transport layer terminating device, such as a gateway or firewall device. In one embodiment, the appliance 205 terminates the transport control protocol by establishing a first transport control protocol connection with the client and a second transport control connection with the second appliance or server. In another embodiment, the appliance 205 terminates the transport control protocol by changing, managing or controlling the behavior of the transport control protocol connection between the client and the server or second appliance. For example, the appliance 205 may change, queue, forward or transmit network packets in a manner to effectively terminate the transport control protocol connection or to act or simulate as terminating the connection.

In one embodiment, the first appliance 205 provides a virtual private network (VPN) connection. In some embodiments, the first appliance 205 provides a Secure Socket Layer VPN (SSL VPN) connection. In other embodiments, the first appliance 205 provides an IPsec (Internet Protocol Security) based VPN connection. In some embodiments, the first appliance 205 provides any one or more of the following functionality: compression, acceleration, load-balancing, switching/routing, caching, and Transport Control Protocol (TCP) acceleration. In one embodiment, the first appliance 205 is any of the product embodiments referred to as Access Gateway, Application Firewall, Application Gateway, or NetScaler manufactured by Citrix Systems, Inc. of Ft. Lauderdale, Fla. In some embodiments, the first appliance 205 is a performance enhancing proxy.

In one embodiment, the second appliance 200 is a device for accelerating, optimizing or otherwise improving the performance, operation, or quality of service of any type and form of network traffic. The second appliance 200 may include an acceleration or optimization device, such as any type and form of WAN optimization device. In some embodiments, the second appliance 200 is a performance enhancing proxy. In some embodiments, the second appliance 200 provides compression of application network traffic. In other embodiments, the appliance 200 provides application and data acceleration services for branch-office or remote offices. In one embodiment, the appliance 200 includes optimization of Wide Area File Services (WAFS). In another embodiment, the appliance 200 accelerates the delivery of files, such as via the Common Internet File System (CIFS) protocol. In other embodiments, the appliance 200 provides caching in memory and/or storage to accelerate delivery of applications and data. In one embodiment, the appliance 200 provides compression of network traffic at any level of the network stack or at any protocol or network layer. In another embodiment, the appliance 200 provides transport layer protocol optimizations, flow control, performance enhancements or modifications and/or management to accelerate delivery of applications and data over a WAN connection. For example, in one embodiment, the appliance 200 provides Transport Control Protocol (TCP) optimizations. In other embodiments, the appliance 200 provides optimizations, flow control, performance enhancements or modifications and/or management for any session or application layer protocol.

In one embodiment, the second appliance 200 is any of the product embodiments referred to as WANScaler manufactured by Citrix Systems, Inc. of Ft. Lauderdale, Fla. In other embodiments, the appliance 200 includes any of the product embodiments referred to as BIG-IP link controller and WANjet manufactured by F5 Networks, Inc. of Seattle, Wash. In another embodiment, the appliance 200 includes any of the WX and WXC WAN acceleration device platforms manufactured by Juniper Networks, Inc. of Sunnyvale, Calif. In some embodiments, the appliance 200 includes any of the steelhead line of WAN optimization appliances manufactured by Riverbed Technology of San Francisco, Calif. In other embodiments, the appliance 200 includes any of the WAN related devices manufactured by Expand Networks Inc. of Roseland, N.J. In one embodiment, the appliance 200 includes any of the WAN related appliances manufactured by Packeteer Inc. of Cupertino, Calif., such as the PacketShaper, iShared, and SkyX product embodiments provided by Packeteer. In yet another embodiment, the appliance 200 includes any WAN related appliances and/or software manufactured by Cisco Systems, Inc. of San Jose, Calif., such as the Cisco Wide Area Network Application Services software and network modules, and Wide Area Network engine appliances.

Although generally referred to as a first appliance 205 and a second appliance 200, the first and second appliance may be the same type and form of appliance. In one embodiment, the second appliance 200 may perform the same functionality, or portion thereof, as the first appliance 205, and vice-versa. For example, the first appliance 205 and second appliance 200 may both provide acceleration techniques. In one embodiment, the first appliance may perform LAN acceleration while the second appliance performs WAN acceleration, or vice-versa. In another example, the second appliance 200 may also be a transport control protocol terminating device.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In some embodiments, one or more servers 106 provide for a Common Internet File System (CIFS) and/or communicate using the CIFS protocol. In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
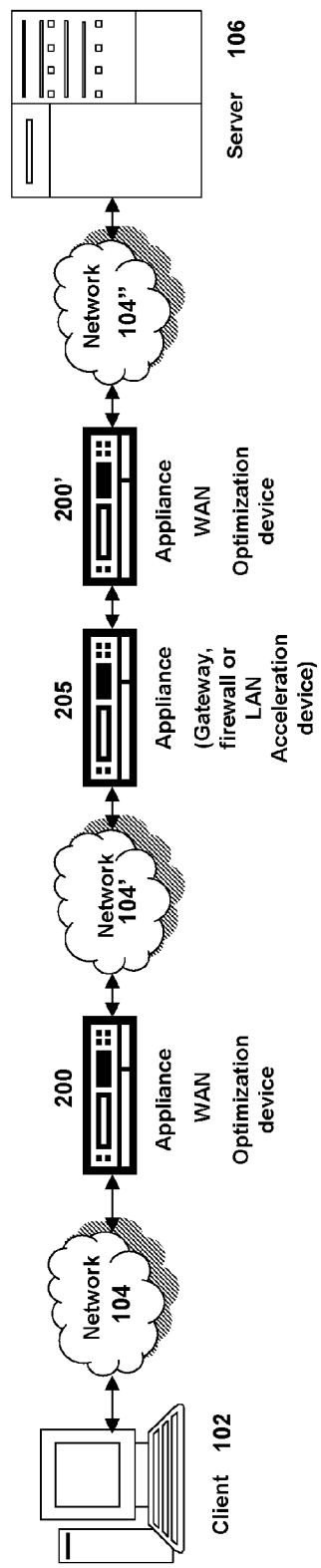
FIG. 1B is a block diagram of another embodiment of a network environment for a client to access a server via one or more appliances.

Although FIG. 1A depicts a network environment having a first appliance 205 and a second appliance 200, the network environment may have multiple appliances 200 and/or 205. Referring now to FIG. 1B, another embodiment of a network environment is depicted in which multiple WAN optimization devices 200 are deployed in conjunction with at least one transport layer termination appliance 205. In brief overview, a first WAN optimization device 200 and a second WAN optimization device 200' may be deployed in a network environment. In some embodiments, the first WAN optimization device 200 works in conjunction or cooperation with the second WAN optimization device 200'. In these embodiments, the WAN optimization devices 200, 200' as will be described in further detail below communicate via information in "tagged" network packets transmitted via the appliances. An appliance 205, such as a firewall or LAN acceleration device, may be deployed in the network between the client 102 and server 106, and/or between the first WAN optimization device 200 and the second WAN optimization device 200'. By way of example in view of embodiments of appliances manufactured by Citrix Systems, Inc., the first and second WAN optimization devices 200, 200' is a WANScaler appliance and appliance 205 is a NetScaler appliance.

Figure 1C:
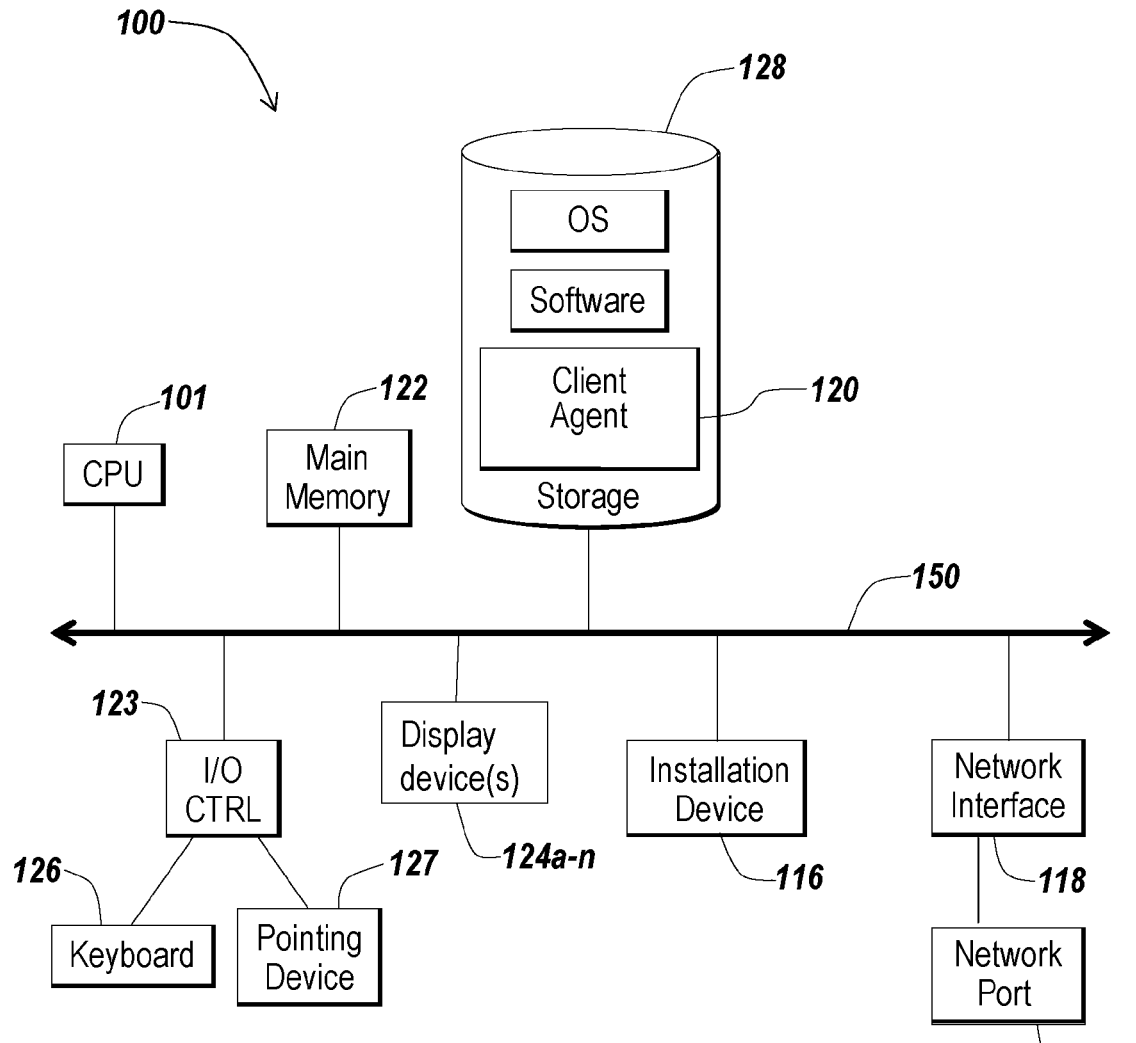
FIGS. 1C and 1D are block diagrams of embodiments of a computing device or appliance.
Figure 1D:
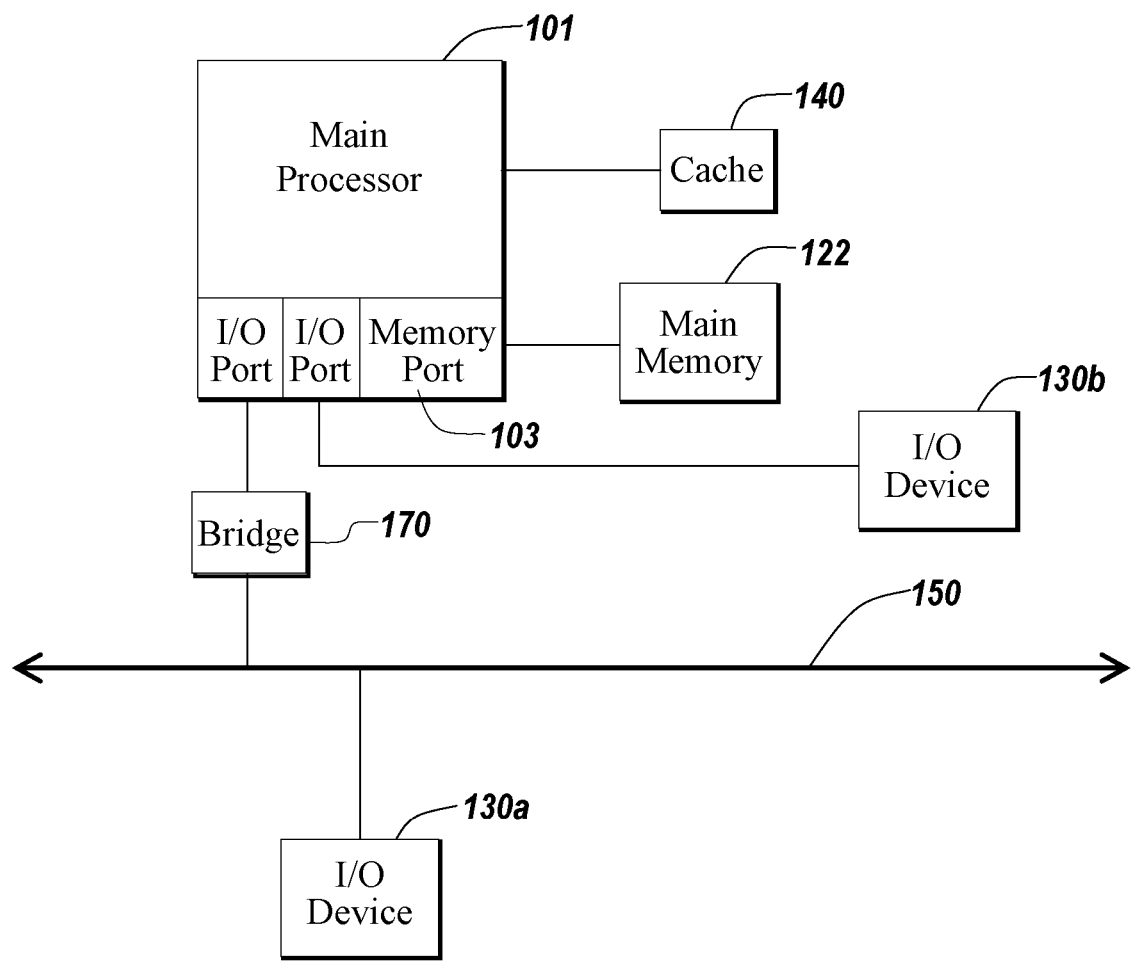

A client 102, server 106, appliance 200 and appliance 205 may be deployed as and/or executed on any type and form of computing device, such as a computer, network device or appliance capable of communicating on any type and form of network and performing any of the operations described herein. FIGS. 1C and 1D depict block diagrams of a computing device 100 useful for practicing an embodiment of the client 102, server 106 or appliance 200, 205. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. The device 100 includes one or more network ports 119 in communications with the network interface 118 for transmitting and receiving data over a network 104. The network port 119 provides a physical and/or logical interface between the device and a network 104 or another device 100 for transmitting and receiving network communications. The network port 119 includes software, hardware or any combination of software and hardware. The type and form of the network port 119 depends on the type and form of network and type of medium for connecting to the network.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS 2003, WINDOWS XP, and WINDOWS VISTA all of which are manufactured by Microsoft Corporation of Redmond, Wash.; MacOS and OS X, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, (such as those versions of Unix referred to as Solaris/Sparc, Solaris/x86, AIX IBM, HP UX, and SGI (Silicon Graphics)), among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. In another example, the computing device 100 may be a WinCE or PocketPC device with an ARM (Advanced RISC Machine) type of processor. In one example, the computing device 100 includes a Series 80 (Nokia 9500 or Nokia 9300) type of smart phone manufactured by Nokia of Finland, which may run the Symbian OS or EPOC mobile operating system manufactured by Symbian Software Limited of London, United Kingdom. In another example, the computing device 100 may include a FOMA M100 brand smart phone manufactured by Motorola, Inc. of Schaumburg, Ill., and operating the EPOC or Symbian OS operating system. In yet another example, the computing device 100 includes a Sony Ericsson P800, P900 or P910 Alpha model phone manufactured by Sony Ericsson Mobile Communications (USA) Inc. of Research Triangle Park, N.C. Moreover, the computing device 100 can be any workstation, desktop computer, laptop or notebook computer, server, handheld computer, mobile telephone, smart phone, any other computer, or other form of computing or telecommunications device that is capable of communication and that has sufficient processor power and memory capacity to perform the operations described herein.

B. System Environment and Client Architecture

Figure 2A:
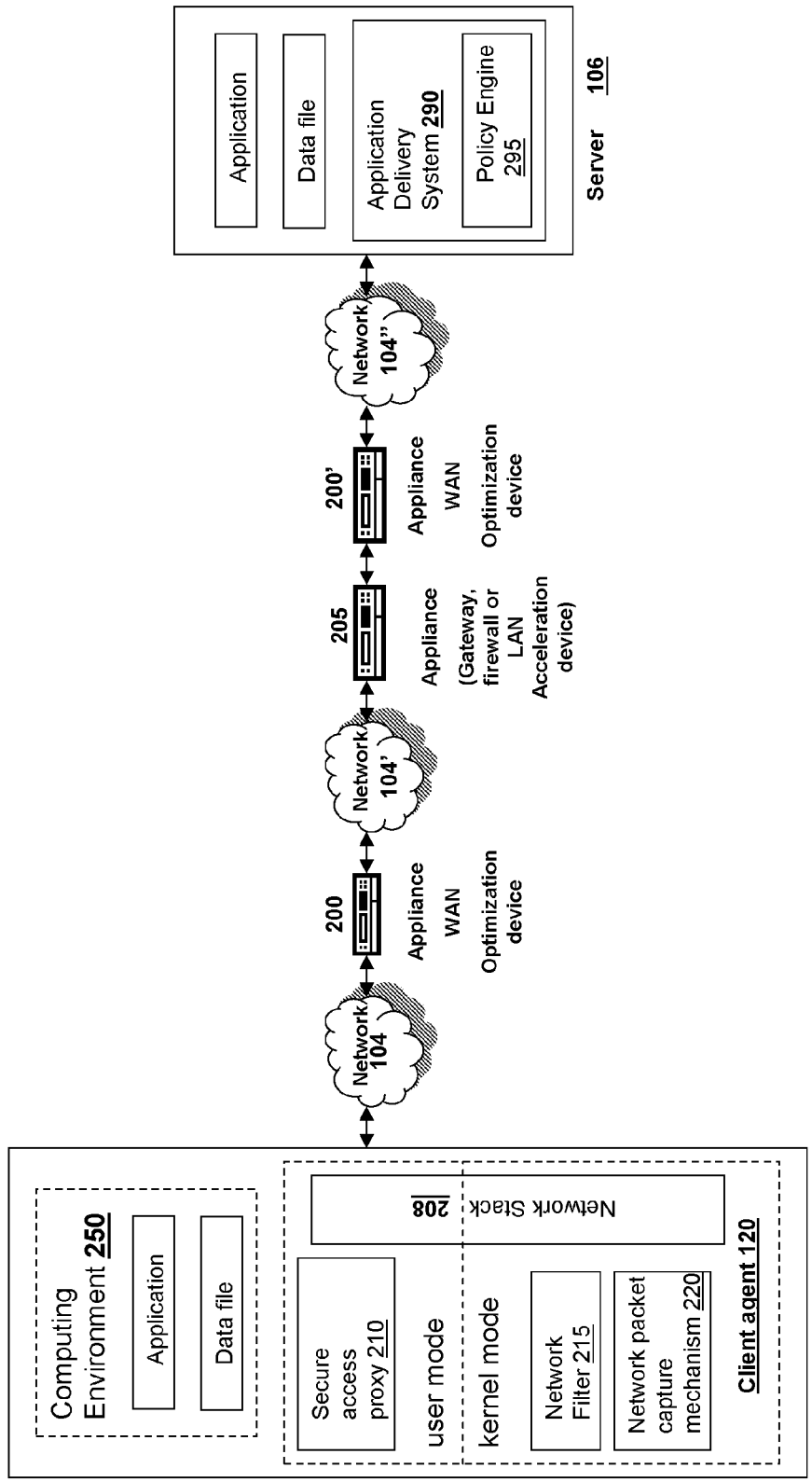
FIG. 2A is a block diagram of an embodiment of an environment for delivering a computing environment from a server to a client via one or more appliances.

Referring now to FIG. 2A, a network environment for delivering and/or operating a computing environment on a client 102 is depicted. In some embodiments, a server 106 includes an application delivery system 290 for delivering a computing environment or an application and/or data file to one or more clients 102. In brief overview, a client 102 is in communication with a server 106 via network 104, 104', 104" and appliances 200 and 205. In some embodiments, a second appliance 200' may be deployed. For example, the client 102 may reside in a remote office of a company, e.g., a branch office, and the server 106 may reside at a corporate data center. The client 102 includes a client agent 120, and a computing environment 250. The computing environment 250 may execute or operate an application that accesses, processes or uses a data file. The application and/or data file of the computing environment 250 may be delivered via the appliance 200, 205 and/or the server 106.

In some embodiments, the appliance 200 and/or 205 accelerates delivery of a computing environment 250, or any portion thereof, to a client 102. In one embodiment, the appliance 200 accelerates the delivery of the computing environment 250 by the application delivery system 290. For example, the embodiments described herein may be used to accelerate delivery of a streaming application and data file processable by the application from a central corporate data center to a remote user location, such as a branch office of a company. In another embodiment, the appliance 205 accelerates transport layer traffic between a client 102 and a server 106. The appliance 205 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 205 or 200 provides load balancing of servers 106 in responding to requests from clients 102. In other embodiments, the appliance 205 acts as a proxy or access server to provide access to the one or more servers 106. In another embodiment, the appliance 205, provides a secure virtual private network connection from a first network 104 of the client 102 to the second network 104' of the server 106, such as an SSL VPN connection. It yet other embodiments, the appliance 205 provides application firewall security, control and management of the connection and communications between a client 102 and a server 106.

In one embodiment, the appliance 205 terminates a first transport layer connection to the client 102. In some embodiments, the appliance 205 establishes a second transport layer connection to the server 106 or to the appliance 200. For example, the appliance 205 may comprise a transport layer termination device, such as a firewall or a SSL VPN device. A client 102 may request to establish a transport layer connection with a server 106 via the appliance 205. In response to the request, the appliance 205 establishes or terminates a first transport layer connection with the client 102, and establishes or uses a second transport layer connection to the server 106.

The appliance 205 provides transport layer communications between the client 102 and server 106 via the first and second transport layer connections.

In some embodiments, the application delivery management system 290 provides application delivery techniques to deliver a computing environment to a desktop of a user, remote or otherwise, based on a plurality of execution methods and based on any authentication and authorization policies applied via a policy engine 295. With these techniques, a remote user may obtain a computing environment and access to server stored applications and data files from any network connected device 100. In one embodiment, the application delivery system 290 may reside or execute on a server 106. In another embodiment, the application delivery system 290 may reside or execute on a plurality of servers 106a-106n. In some embodiments, the application delivery system 290 may execute in a server farm 38. In one embodiment, the server 106 executing the application delivery system 290 may also store or provide the application and data file. In another embodiment, a first set of one or more servers 106 may execute the application delivery system 290, and a different server 106n may store or provide the application and data file. In some embodiments, each of the application delivery system 290, the application, and data file may reside or be located on different servers. In yet another embodiment, any portion of the application delivery system 290 may reside, execute or be stored on or distributed to the appliance 205, 205, or a plurality of appliances.

The client 102 may include a computing environment 250 for executing an application that uses or processes a data file. The client 102 via networks 104, 104' and appliance 205 may request an application and data file from the server 106. In one embodiment, the appliance 200, 205 may forward a request from the client 102 to the server 106. For example, the client 102 may not have the application and data file stored or accessible locally. In response to the request, the application delivery system 290 and/or server 106 may deliver the application and data file to the client 102. For example, in one embodiment, the server 106 may transmit the application as an application stream to operate in computing environment 250 on client 102.

In some embodiments, the application delivery system 290 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 290 may deliver one or more applications to clients 102 or users via a remote-display protocol or otherwise via remote-based or server-based computing. For example, the application delivery system 290 may transmit an application or data file via the Independent Computing Architecture (ICA) protocol manufactured by Citrix Systems, Inc. of Ft. Lauderdale, Fla. In another example, the application delivery system 290 may transmit an application or data file via the Remote Desktop Protocol (RDP) manufactured by the Microsoft Corporation of Redmond, Wash. In one embodiment, the application delivery system 290 may transmit the computing environment 250, or any portion thereof, via streaming.

In some embodiments, the application delivery system 290 includes a policy engine 195 for controlling and managing the access to and selection of application execution methods and the delivery of applications. In some embodiments, the policy engine 195 provides for authentication, authorization and auditing of users and clients. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 290 provides a plurality of delivery techniques from which to select a method of application execution, such as a server-based computing, streaming or delivering the application locally to the client 120 for local execution.

In one embodiment, a client 102 requests execution of an application program and the application delivery system 290 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 290 enumerates a plurality of application programs available to the client 102. The application delivery system 290 receives a request to execute an enumerated application. The application delivery system 290 selects one of a predetermined number of methods for executing the enumerated application, for example, responsive to a policy of a policy engine. The application delivery system 290 may select a method of execution of the application enabling the client 102 to receive application-output data generated by execution of the application program on a server 106. The application delivery system 290 may select a method of execution of the application enabling the client 102 to execute the application program locally after retrieving a plurality of application files comprising the application. In yet another embodiment, the application delivery system 290 may select a method of execution of the application to stream the application via the network 104 to the client 102.

A client 102 or computing environment 250 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol or the Remote Desktop Protocol (RDP). The application can use any type of protocol and it can be, for example, an HTTP client, an FTP client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEX™ provided by WebEx, Inc. of Santa Clara, Calif., or Microsoft Office Live Meeting provided by Microsoft Corporation of Redmond, Wash.

Client Agent

FIG. 2A also depicts an embodiment of a client for communicating between the client and a server via appliance 200 and/or appliance 205. The client 102 includes a client agent 120 for establishing and exchanging communications with the appliance 205, or 200, and/or server 106 via a network 104. In brief overview, the client 102 operates on computing device 100 having an operating system with a kernel mode and a user mode, and a network stack 208 with one or more protocol layers. The client 102 may have installed and/or execute one or more applications. In some embodiments, one or more applications may communicate via the network stack 208 to a network 104. The client agent 120 includes a secure access proxy 210, a network filter 215 and a network packet capture mechanism, 220 for intercepting network communications from the network stack 208 from the one or more applications and communicating to an appliance 200, 205. The secure access proxy 210, a network filter 215 and a network capture mechanism, 220 may include any application, program, library, service, process, task, thread or set of executable instructions.

The network stack 208 of the client 102 may comprise any type and form of software, or hardware, or any combinations thereof, for providing connectivity to and communications with a network. In one embodiment, the network stack 208 comprises a software implementation for a network protocol suite. The network stack 208 may comprise one or more network layers, such as any networks layers of the Open Systems Interconnection (OSI) communications model as those skilled in the art recognize and appreciate. As such, the network stack 208 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 208 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 208 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 208 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 208, such as for voice communications or real-time data communications.

Furthermore, the network stack 208 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 208 may be customized, modified or adapted to provide a custom or modified portion of the network stack 208 in support of any of the techniques described herein. In other embodiments, the client agent 120 is designed and constructed to operate with or work in conjunction with the network stack 208 installed or otherwise provided by the operating system of the client 102.

The network stack 208 includes any type and form of interface for receiving, obtaining, providing or otherwise accessing any information and data related to network communications of the client 102. In one embodiment, an interface to the network stack 208 provides an application programming interface (API). The interface may also include any function call, hooking or filtering mechanism, event or call back mechanism, or any type of interfacing technique. The network stack 208 via the interface may receive or provide any type and form of data structure, such as an object, related to functionality or operation of the network stack 208. For example, the data structure may comprise information and data related to a network packet or one or more network packets. In some embodiments, the data structure comprises a portion of the network packet processed at a protocol layer of the network stack 208, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 208 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 208 may execute or operate in kernel-mode, for example, the data link or network layer, while other portions execute or operate in user-mode, such as an application layer of the network stack 208. For example, a first portion 3 of the network stack may provide user-mode access to the network stack 208 to an application while a second portion of the network stack 208 provides access to a network. In some embodiments, a first portion 3 of the network stack may comprise one or more upper layers of the network stack, such as any of layers 5-7. In other embodiments, a second portion of the network stack comprises one or more lower layers, such as any of layers 1-4. Each of the first portion and second portion of the network stack 208 may comprise any portion of the network stack 208, at any one or more network layers, in user-mode, kernel-mode, or combinations thereof, or at any portion of a network layer or interface point to a network layer or any portion of or interface point to the user-mode and kernel-mode.

The network packet capture mechanism 220, also referred to as an interceptor or the network capture mechanism, may comprise software, hardware, or any combination of software and hardware. In one embodiment, the network capture mechanism 220 intercepts a network communication at any point in the network stack 208, and redirects or transmits the network communication to a destination desired, managed or controlled by the network capture mechanism 220 or client agent 120. For example, the network capture mechanism 220 may intercept a network communication of a network stack 208 of a first network and transmit the network communication to the appliance 205 for transmission on a second network.

In some embodiments, the network capture mechanism 220 comprises any type and form of a driver, such as a network driver constructed and designed to interface and work with the network stack 208. In other embodiments, the client agent 120 and/or network capture mechanism 220 operates at one or more layers of the network stack 208, such as at the transport layer. In one embodiment, the network capture mechanism 220 comprises a filter driver, hooking mechanism, or any form and type of suitable network driver interface that interfaces to the transport layer of the network stack, such as via the transport driver interface (TDI). In some embodiments, the network capture mechanism 220 interfaces to a first protocol layer, such as the transport layer and another protocol layer, such as any layer above the transport protocol layer, for example, an application protocol layer. In one embodiment, the network capture mechanism 220 may comprise a driver complying with the Network Driver Interface Specification (NDIS), or a NDIS driver. In another embodiment, the network capture mechanism 220 may comprise a mini-filter or a mini-port driver. In one embodiment, the network capture mechanism 220, or portion thereof, operates in kernel-mode. In another embodiment, the network capture mechanism 220, or portion thereof, operates in user-mode. In some embodiments, a portion of the network capture mechanism 220 operates in kernel-mode while another portion of the network capture mechanism 220 operates in user-mode. In other embodiments, the client agent 120 operates in user-mode but interfaces via the network capture mechanism 220 to a kernel-mode driver, program process, service, thread, task or portion of the operating system, such as to obtain a kernel-level data structure 225. In further embodiments, the network capture mechanism 220 is a user-mode application or program.

The client agent 120 or network packet capturing mechanism 220 may include a network filter 215. The network filter 215 includes any type and form of filtering or hooking mechanism to intercept a network packet at any layer of network stack 208 provide one or more transport layer options, such as TCP options to the packet. In one embodiment, the network filter 215 comprises any of the embodiments of the network packet capturing mechanism 220, or any portion thereof as described above. In some embodiments, the network filter 215 operates at a layer of the network stack 208 above the layer the network packet capture mechanism 220. For example, the network filter 215 may operate at an application layer and the network packet capture mechanism 220 at the transport layer. In another embodiment, the network filter 215 may operate at the transport layer and the network packet capture mechanism 220 at the network layer. For example, the network filter 215 may include a Transport Driver Interface (TDI) and the network packet capture mechanism 220, an NDIS driver. In yet other embodiments, the network filter 215 operates at the same layer of the network stack 208 but is called or executed prior to the network packet capture mechanism 220. In some embodiments, the network filter 215 intercepts the network packet prior to the network packet capture mechanism 220. In one embodiment, the network filter 215 captures a network packet transparently to the network packet capture mechanism 220.

The network filter 215 may insert, attach, add, modify or otherwise provide one or more transport layer options to a network packet. In one embodiment, the network filter 215 adds or attaches a TCP option to the TCP header of the packet. In another embodiment, the network filter 215 modifies a TCP option of the TCP header of the packet. In some embodiments, the network filter 215 removes a TCP option to the TCP header of the packet. The network filter 215 may operate on any portion of the bytes or set of bytes at the end of the TCP header identified as TCP options. In one embodiment, the TCP options may include 40 bytes. In some embodiments, the TCP options have option ids, such as ids 1-26. In one embodiment, the network filter 215 uses one of the option ids from 1-26. In another embodiment, the network filter 215 use an option id greater than 26, such any options with ids in the range of 27-99.

In one embodiment, the network filter 215 provides a TCP header option to pass proprietary control information between the client 102 and an appliance 200. In other embodiments, the network filter 215 provides a TCP header option to announce a presence of the client, client agent or appliance. As discussed above in conjunction with FIGS. 2B-2D, TCP options may be used for automatic WAN and/or LAN detection by an appliance. In another embodiment, the network filter 215 provides a TCP header option to identify or specify available functionality, service or capability of a client, client agent or appliance. In some embodiments, the network filter 215 provides a TCP header option to identify WAN optimization or acceleration functionality is available on the client, client agent or appliance.

The client agent 120 may also include a secure access proxy 210 to provide for communications between the client 102 and an appliance 200, 205 or server 106. The secure access proxy 210 may operate in user mode. In other embodiments, the secure access proxy 210 may operate in kernel mode. In still other embodiments, a first portion of the secure access proxy may operate in user mode while a second portion operates in kernel mode.

In some embodiments, the secure access proxy 210 establishes a transport layer connection, such as via TCP or UDP, with the appliance 200, 205. In one embodiment, the secure access proxy 210 provides a secure socket layer virtual private network connection between the client 102 and the appliance 200, 205 or server 106. In another embodiment, the secure access proxy 210 provides a tunnel for or otherwise tunnels communications of the client 102 to a server 106 via the appliance 200, 205. In some embodiments, the secure access proxy 210 transmits to and/or receives from the appliance commands, control information, configuration information and data from a connection with the appliance 205. In one embodiment, the secure access proxy 210 and the appliance 205 communicate via control packets, or packets having any type and form of structure to exchange control information. In some embodiments, the control packets are in the form of HTTP request/responses having commands, data and information understood by the secure access proxy 210 and the appliance 205.

In some embodiments, the secure access proxy 210 works in conjunction with the network packet capture mechanism 220 to intercept networks packets of an application and transmit the network packets to the appliance 205, 200 or server 106 via the secure access proxy 210. In one embodiment, the network capture mechanism 220 intercepts any transport layer connection requests. In these embodiments, the network capture mechanism 220 execute transport layer application programming interface (API) calls to set the destination information, such as destination IP address and/or port to a desired location for the location. In this manner, the network capture mechanism 220 intercepts and redirects the transport layer connection to a IP address and port controlled or managed by secure access proxy 210 or client agent 120. In one embodiment, the network capture mechanism 220 sets the destination information for the connection to a local IP address and port of the client 102 on which the client agent 120 is listening. For example, the secure access proxy 210 may comprise a proxy service listening on a local IP address and port for redirected transport layer communications. In some embodiments, the secure access proxy 210 then communicates the redirected transport layer communication to the appliance 205.

In some embodiments, the network capture mechanism 220 intercepts a Domain Name Service (DNS) request. In one embodiment, the client agent 120 and/or network capture mechanism 220 resolves the DNS request. In another embodiment, the interceptor transmits the intercepted DNS request to the appliance 205 or 200 for DNS resolution. In one embodiment, the appliance 200, 205 resolves the DNS request and communicates the DNS response to the client agent 120. In some embodiments, the appliance 205 resolves the DNS request via another appliance 205' or a DNS server 106.

In yet another embodiment, the client agent 120 may comprise two agents 120 and 120'. In one embodiment, a first agent 120 may comprise a network capture mechanism 220 operating at the network layer of the network stack 208. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or any portion thereof, may operate at or interface with a protocol layer in a manner transparent to any other protocol layer of the network stack 208. For example, in one embodiment, the network capture mechanism 220 operates or interfaces with the transport layer of the network stack 208 transparently to any protocol layer below the transport layer, such as the network layer, and any protocol layer above the transport layer, such as the session, presentation or application layer protocols. This allows the other protocol layers of the network stack 208 to operate as desired and without modification for using the network capture mechanism 220. As such, the client agent 120 can interface with the transport layer to secure, optimize, accelerate, route or load-balance any communications provided via any protocol carried by the transport layer, such as any application layer protocol over TCP/IP.

Furthermore, the client agent 120, or any portion thereof, may operate at or interface with the network stack 208 in a manner transparent to any application, a user of the client 102, and any other computing device, such as a server, in communications with the client 102. The client agent 120 and/or any portion thereof may be installed and/or executed on the client 102 in a manner without modification of an application. In some embodiments, the user of the client 102 or a computing device in communications with the client 102 are not aware of the existence, execution or operation of the client agent 120 and/or network capture mechanism 220. As such, in some embodiments, the client agent 120 and/or any portion thereof is installed, executed, and/or operated transparently to an application, user of the client 102, another computing device, such as a server, or any of the protocol layers above and/or below the protocol layer interfaced to by the network capture mechanism 220.

C. Automatic LAN/WAN Port Detection

In some embodiments, the appliance 200, or appliance 205, uses a technique with transport control protocol header options or tagged packets to automatically identify and determine the type or speed of a network connection of a port. In one embodiment, the appliance 200 automatically detects a slow side connection (e.g., a wide area network (WAN) connection) and a fast side connection (e.g., a local area network (LAN) connection). The apparatus includes two or more ports, with a first port connectable to one network and a second port connectable to another network. The device is configured to monitor network traffic on the first port and the second port to detect a synchronization packet. The device is also configured to identify receipt of a synchronization packet that is tagged with an acknowledgement packet and on which port it is received. The device then configures itself to operate the identified port on which the tagged synchronization packet arrived so that the speed on that port is set to be the speed associated with the network connected to that port. The other port is then set to the speed associated with the network connected to that port.

Figure 2B:
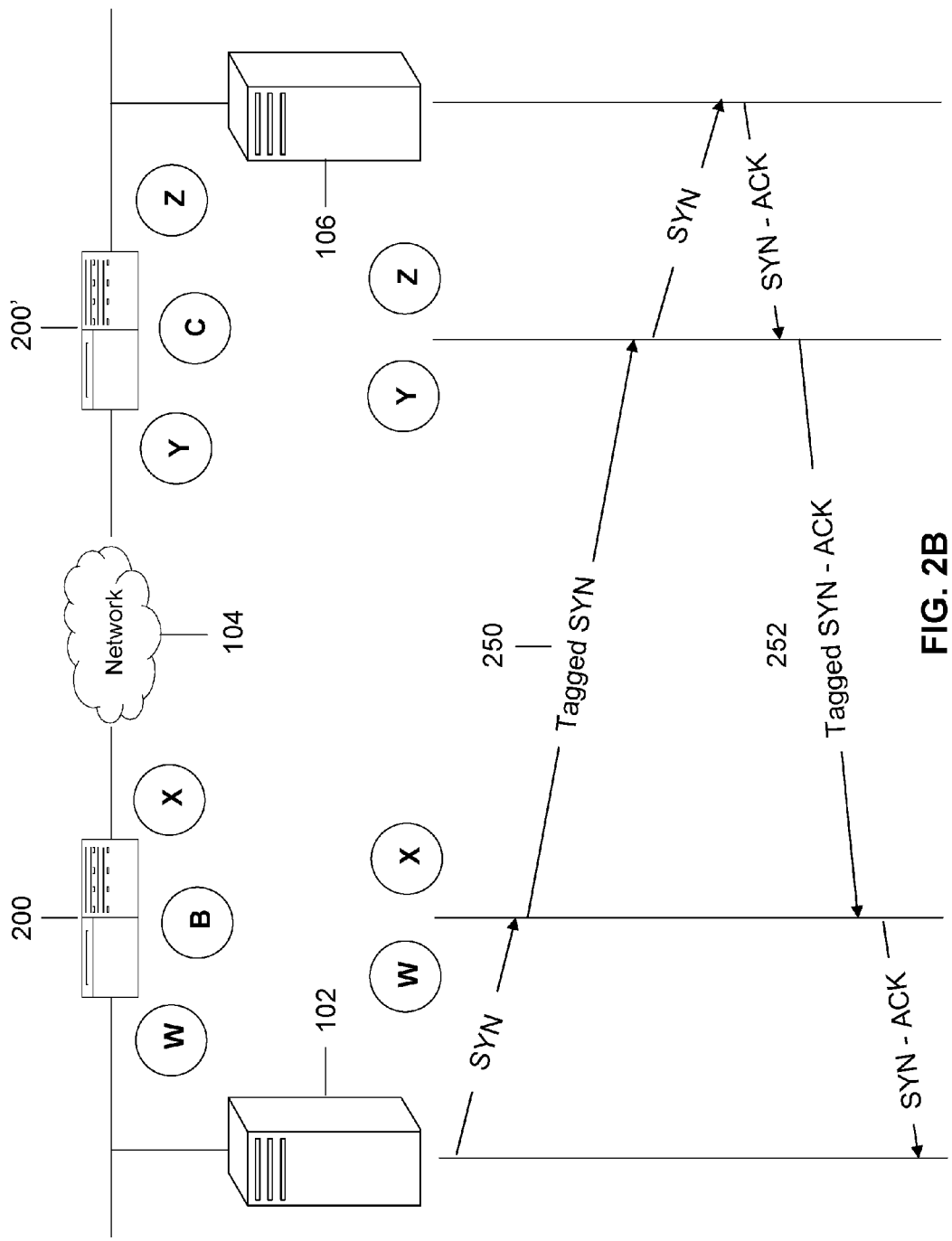
FIG. 2B is a block diagram of an embodiment of a system for automatically detecting a fast side and slow side of a connection traversing an appliance.
Figure 2C:
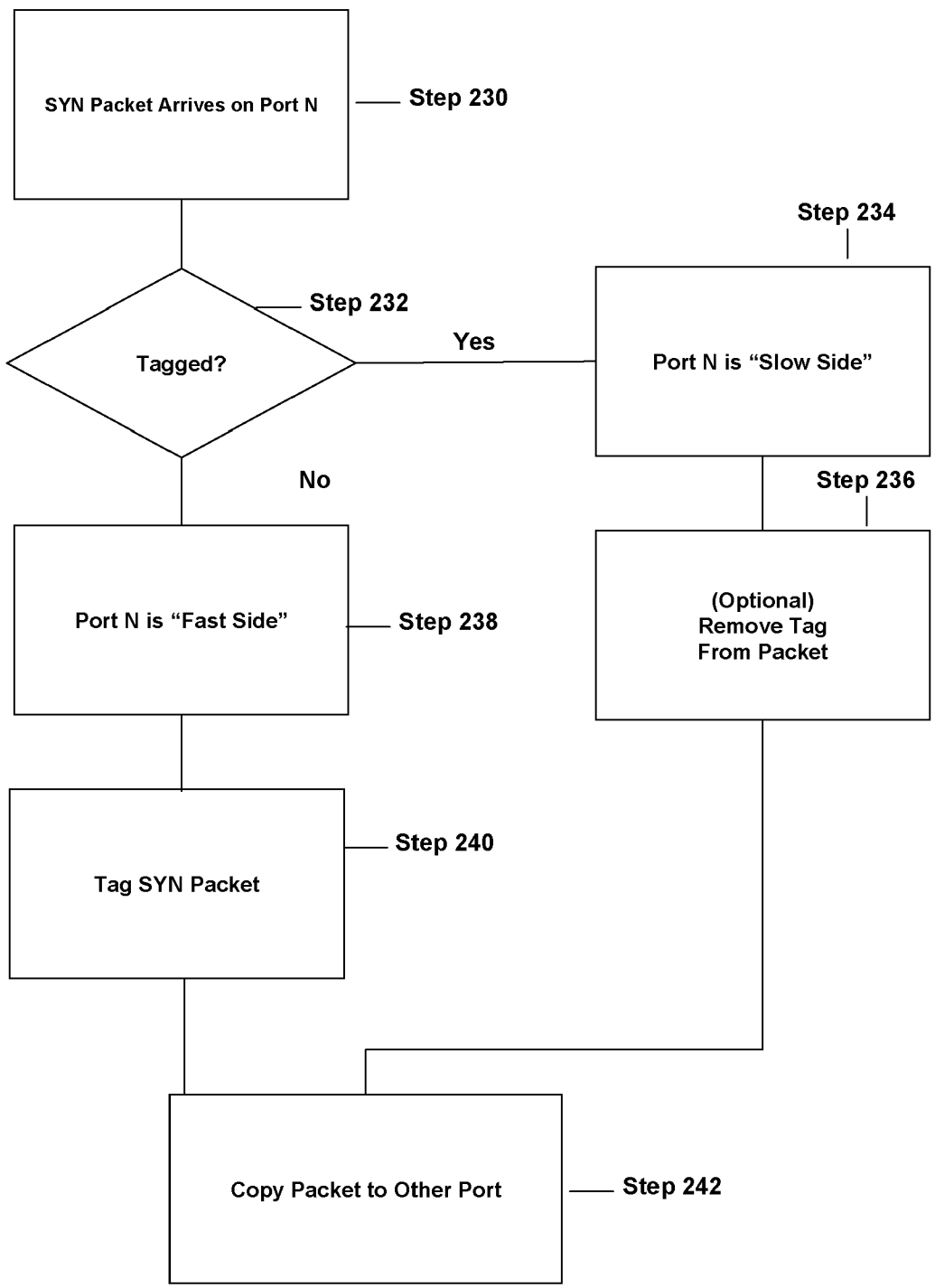
FIG. 2C is a flow diagram depicting steps of an embodiment of a method for detecting a fast side and a slow side of a network connection traversing an appliance.
Figure 2D:
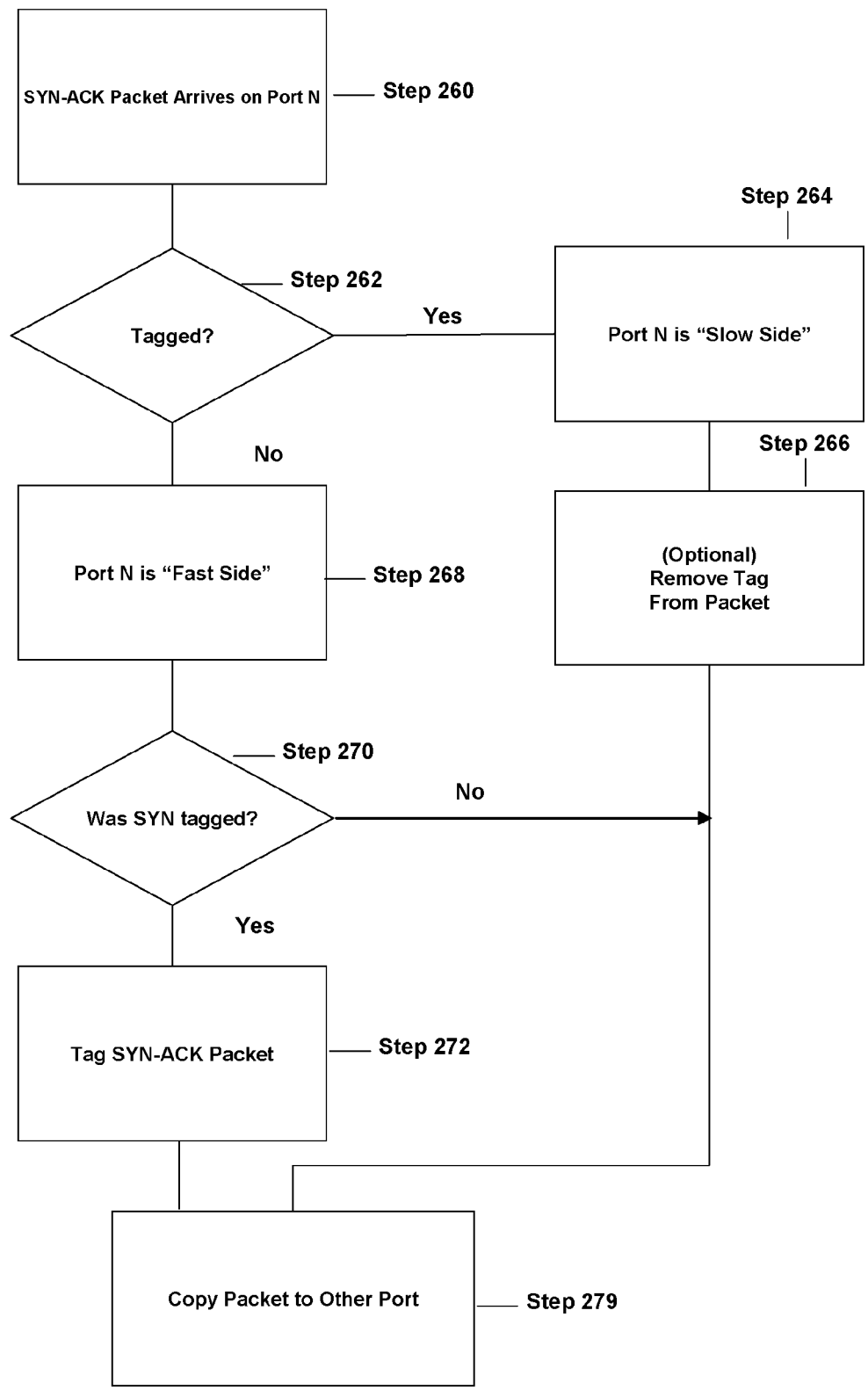
FIG. 2D is a flow diagram depicting steps of another embodiment of a method for detecting a fast side and a slow side of a network connection traversing an appliance.

Referring now to FIGS. 2B, 2C and 2D, a system and methods for automatically detecting a type or speed of a network connection of a port of an appliance 200 are described. FIG. 2B illustrates an embodiment of communication between devices in a network over a wide area network. The network includes a first local system 102 (or client), a first WAN optimization appliance B 200, a second WAN optimization appliance C 200', and a second local system 106 (or server). The client is communicatively coupled to the first appliance B 200 through a network, e.g., a local area network (or LAN), and the server 106 is communicatively coupled to the second appliance C 200' through another network, e.g., another LAN. The two appliances B 200 and C 200' are communicatively coupled with each other through a wide area network, e.g., the Internet. In one embodiment, the appliance B and appliance C may be configured so that each is aware of the other's presence. In some embodiments, the appliances B, and C are configured to accelerate transmission control protocol (TCP) connections on Internet Protocol (IP) networks.

In one embodiment, the configuration illustrated in FIG. 2A may be structured to allow for auto-discovery by an appliance 200, e.g., appliance B and/or appliance C, of a network to which it connects. For example, an auto-discovery mechanism in operation in accordance with FIG. 2A functions as follows: appliance B and appliance C are placed in line with the connection linking end nodes A and D. The appliance B and appliance C are at the ends of a low-speed link, e.g., Internet, connecting two LANs. In one example embodiment, appliance B and appliance C each include two ports—one to connect with the "low" speed link and the other to connect with a "high" speed link, e.g., a LAN. Any packet arriving at one port is copied to the other port. Thus, appliance B and appliance C are each configured to function as a bridge between the two networks.

When an end node, such as the client 102, opens a new TCP connection with another end node, such as the server 106, the end node addresses a TCP packet with a synchronization (SYN) header bit set to the other end node. In the present example, the end node of client 102 opens a connection to end node of the server 106. When the SYN packet passes through appliance B, the appliance attaches or otherwise provides a characteristic TCP header option to the packet, which announces its presence. If the packet 250 happens to pass through a second appliance, in this example appliance C, the second appliance C notes the header option on the tagged SYN packet 250. The server 106 responds to the SYN packet with a synchronization acknowledgment (SYN-ACK) packet. When the SYN-ACK packet passes through appliance C, a TCP header option is tagged (e.g., attached) to the SYN-ACK packet 252 to announce appliance C's presence to appliance B. Any type, form or content of a TCP header option may be included in the packet to identify or announce the presence of appliance C. When appliance B receives this packet 252, both appliances are now aware of each other and the connection can be appropriately accelerated.

FIGS. 2C and 2D illustrate embodiments of steps of a method for detecting "fast" and "slow" sides of a network using the techniques described herein. For ease of discussion, reference to a "fast" side will be made with respect to connection with a wide area network (WAN), e.g., the Internet, and operating at a network speed of the WAN. Likewise, reference to a "slow" side will be made with respect to connection with a local area network (LAN) and operating at a network speed the LAN. However, it is noted that "fast" and "slow" sides are relative terms and in a network can change on a per-connection basis. In some embodiments, such configurations are useful in complex network topologies, where a network is "fast" or "slow" only when compared to adjacent networks and not in any absolute sense.

Turning now to FIG. 2C, a method for detecting "fast" and "slow" sides of a network using a SYN packet is illustrated in view of FIG. 2B. At step 230, the method includes SYN processing by the appliance 200 followed by determination of whether the SYN packet is tagged with an acknowledgement (ACK) at step 232. If the SYN packet 250 is tagged, the method identifies at step 234 (or configures) the port receiving the tagged SYN packet 250 as the "slow" side. In some embodiments, the method may optionally remove at step 236 the ACK tag from the packet before copying the packet to the other port at step 242. If the method determines at step 238 that the packet is not tagged, the method identifies at step 240 (or configures) the port receiving the untagged packet as the "fast" side. In one embodiment, the method then tags at step 240 the SYN packet and copies the packet to the other port at step 242.

Referring next to FIG. 2D, an embodiments of steps of a method for detecting fast and slow sides of a network using a SYN-ACK packet 252 is illustrated. The method includes at step 260 SYN-ACK processing by the appliance 200 followed by determination at step 262 of whether the SYN-ACK packet 252 is tagged with an acknowledgement (ACK). If the packet 252 is tagged, the method at step 264 identifies (or configures) the port receiving the tagged SYN packet (SYN-ACK) 252 as the "slow" side. In one embodiment, the method optionally removes the ACK tag from the packet at step 266 before copying the packet to the other port at step 279. If the method determines at step 266 that the packet is not tagged, the method identifies at step 268 (or configures) the port receiving the untagged packet as the "fast" side. The method determines at step 270 whether the SYN packet was tagged. In some embodiments, a packet may be tagged if the packet includes any predetermined type, form or content of a TCP header option. If the SYN packet was not tagged, the SYN-ACK packet is copied at step 279 to the other port. If the SYN packet was tagged, the method tags the SYN-ACK packet 252 at step 272 before copying the packet 252 to the other port at step 279.

An advantage of these techniques described herein is that particular ports, e.g., of an apparatus, need not be unnecessarily predetermined to be dedicated to one network or another via pre-configured software or hardware. Such configuration often results in confusion if not properly labeled or network failure if not properly connected to the appropriate networks. A configuration in accordance with the systems and methods described herein eliminate these, and other, issues in a network. Additionally, automated assignment of ports can occur whenever a device performs different functions on different ports, where the assignment of a port to a task can be made during the unit's operation, and/or the nature of the network segment on each port is discoverable by software.

Although the techniques above are generally described in connection with automatic WAN and LAN detection between appliances, these techniques are applicable in non-appliance implementations. For example, these technique can be applied between a client and an appliance, a client and a server, and a server and an appliance. Furthermore, these techniques are not limited to automatic WAN and LAN port detection or detecting presence of another device but the technique of tagging packets can be used for detecting capability, functionality or services available, or the presence thereof, between one or more clients, servers or appliances. Additionally, the tagged packets may be used to share, announce or exchange parameters between devices, such as WAN optimization related parameters.

D. Preserving TCP Options Communicated Via A TCP Terminating Device

Referring now to FIGS. 3A-3B and 4A-4B, techniques for preserving transport layer options communicated between a transport layer terminating device are described. As described above, appliances 200 and 200', a client and appliance 200, client and server, or server and appliance 200 may use transport layer options to identify presence, capability or functions between devices, such as automatic WAN/LAN port detection or WAN optimization capabilities. As illustrated in FIG. 1A or 1B, a transport layer protocol terminating device 205 may be in the network path between appliances 200 and 200', or between the client and server. With the techniques to be described below, the transport layer terminating device 205 seamlessly and transparently handles, manages or otherwise provides for the transmission of transport layer options between devices over multiple transport layer connections. For example, the appliance 205 may terminate a first transport layer connection with the client and a second transport layer connection with the server. Using a transport layer option preservation technique, the appliance 205 maintains transport layer options established by the client or appliance 200 transmitted to a server via the appliance 205. Likewise, the appliance 205 may maintain transport layer options established by the server or appliance 200' transmitted to a client via the appliance 205. This allows the appliance 205, client and/or server that support the TCP option tagging described above to work in an environment having a transport protocol layer terminating device 205, such as a firewall.

Figure 3A:
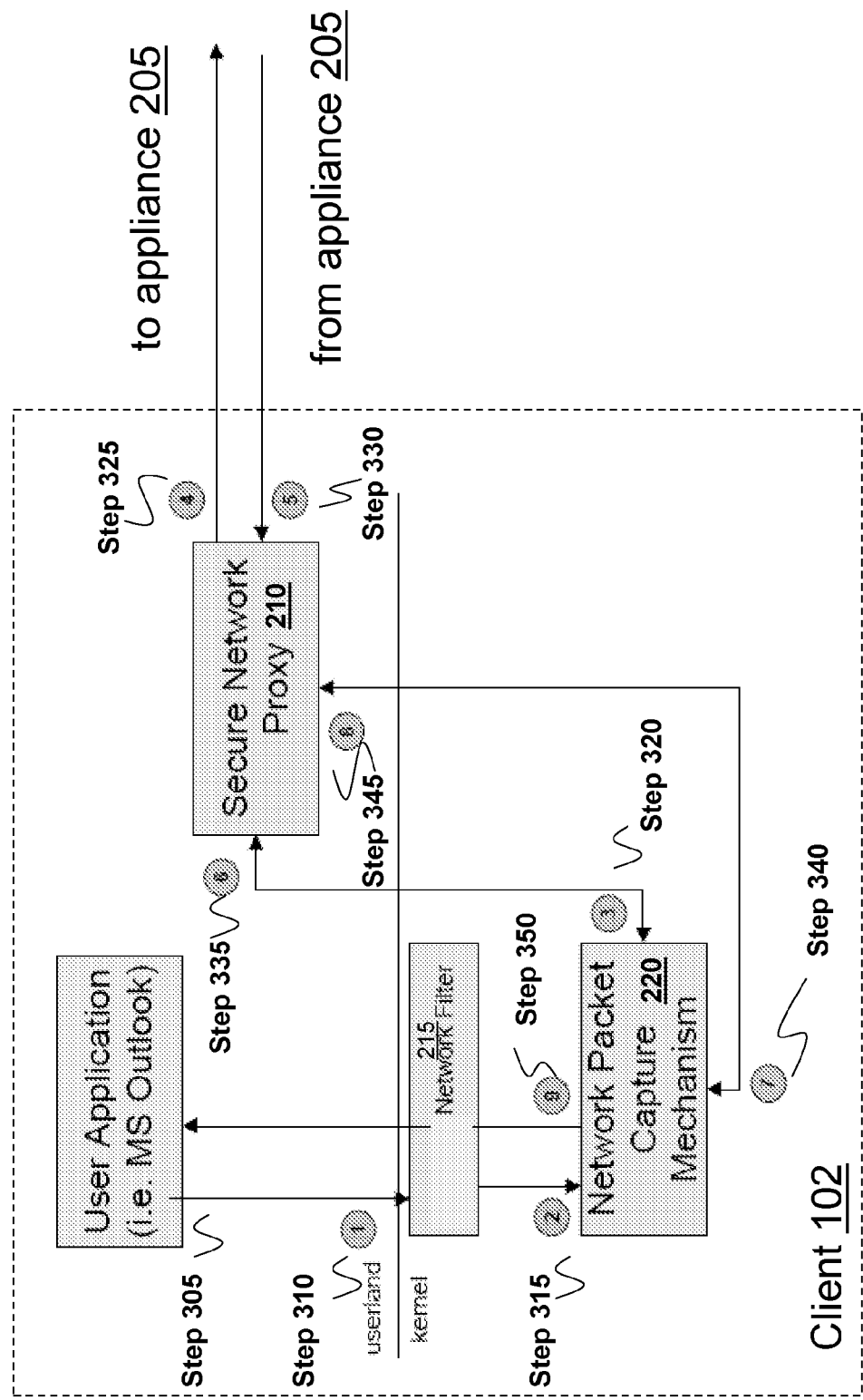
FIG. 3A is a block diagram of an embodiment of a client for processing communications between a client and an appliance.
Figure 3B:
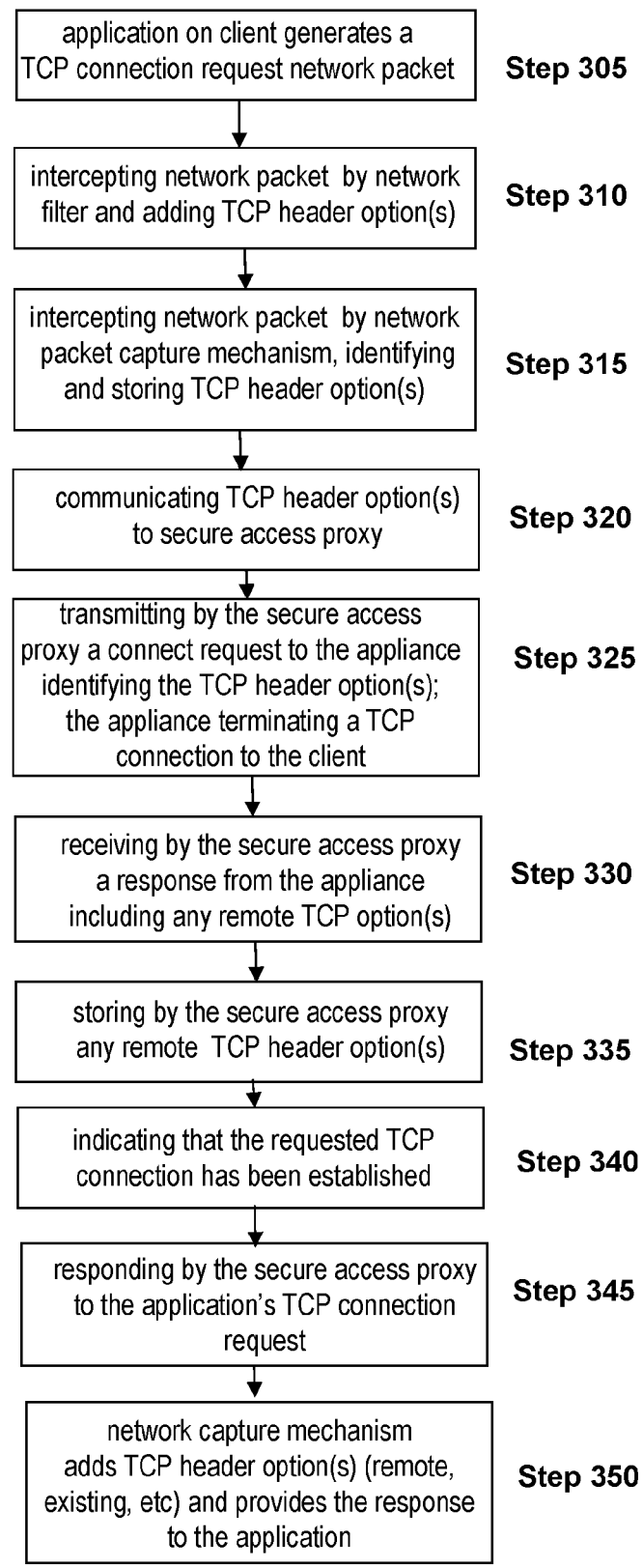
FIG. 3B is a flow diagram depicting steps of an embodiment of a method for practicing a technique for preserving a transport layer option by a client in accordance with the embodiment of FIG. 3A.

Referring now to FIGS. 3A and 3B, a technique for preserving transport layer options on the client via a terminated transport layer connection is depicted. In some embodiments, the client agent 120 terminates a first transport layer connection with an application and establishes a second transport layer connection with an appliance 205. An embodiment of method 300 of FIG. 3B will be discussed in conjunction with the embodiment of the client 102 illustrated in FIG. 3A.

In brief overview of method 300, at step 305, an application on the client 102 generates a transport layer connection request network packet, such as a packet for a TCP connection request. At step 310, the network filter intercepts the generated network packet and adds a TCP header option. At step 315, the network packet capture mechanism 220 intercepts the network packet and identifies and stores the TCP header option. At step 330, the network packet capture mechanism 220 communicates the TCP header options to the secure access proxy 210. At step 325, the secure access proxy 320 transmits a connection request to the appliance 205 identifying the TCP header option. The appliance 205 terminates a TCP connection with the client 102. At step 330, the secure access proxy 210 receives a response from the appliance to the connect request. The response may include any remote TCP options, such as a TCP option established by the server 106 or appliance 200. At step 335, the secure access proxy 210 stores any remote TCP header options(s). At step 340, the secure access proxy 210 indicates to the network packet capture mechanism 220 the requested transport layer connection has been established. At step 345, the secure access proxy 210 responses to the application's TCP connection request. At step 350, the network packet capture mechanism 220 adds TCP header options—such as remote TCP options or existing TCP options—and the secure access proxy 210 provides the response to the application.

In further detail, at step 305, an application on the client 102 requests a transport layer connection to a server 106. In making the request, the application causes a connection request network packet to be generated on the network stack 208. The application may use any interfaces or application programming interfaces, such as a socket API, for example, WinSock API, to the network stack 208 to make a transport layer connection request. In one embodiment, the application requests a TCP connection to a server 106. For example, the generated network packet may comprise a TCP SYN packet for a TCP connection request. In another embodiment, the application requests a UDP connection to the server 106.

At step 310, the network filter 215 intercepts or otherwise receives the generated network packet identifying the transport layer connection request of the application. In one embodiment, the network filter 215 adds or provides TCP header options to the intercepted connection request. In one embodiment, the network filter 215 adds or provides one TCP header option. In another embodiment, the network filter 215 adds or provides multiple TCP header options. In some embodiments, the network filter 215 puts the modified network packet with the TCP options on the network stack 208 or otherwise allows the modified network packet to continue traversing the network stack 208. In other embodiments, the network filter 215 communicates the modified network packet to the network packet capture mechanism 220.

At step 315, the network packet capture mechanism 220 intercepts from the network stack or otherwise receives the network packet from step 310. In one embodiment, the network packet capture mechanism 220 identifies the TCP header option(s) added to or provided with the network packet. In another embodiment, network packet capture mechanism 220 identifies the TCP header option(s) is from an applications of the client or a local user application. In some embodiments, the network packet capture mechanism 220 stores the identified TCP header option(s) to storage or memory.

For example, in one embodiment, the network packet capture mechanism 220 stores or copies a TCP header option into a buffer in storage or memory, such as any type and form of data structure. In one embodiment, the network packet capture mechanism 220 stores these TCP options in a table, such as filter table, in association with the TCP session. For example, the network packet capture mechanism 220 stores TCP options in association with any combination of source IP address, source port, destination IP address and destination port. In another example, the network packet capture mechanism 220 stores TCP options in context with the TCP session or with a TCP session identifier. In yet another example, the network packet capture mechanism 220 stores TCP options in association with an application identifier or process id. In some embodiments, the buffer is of variable length, anywhere between 8 and 40 bytes or to a predetermined length or size of transport layer options supported by the transport layer protocol. In one embodiment, the buffer is aligned on a 32-bit boundary. In these cases, valid buffer lengths are 8, 16, 24, 32, or 40 bytes. In another embodiment, the network capture mechanism 220 stores to the buffer all TCP options added to the packet up to the point of interception.

At step 320, the network packet capture mechanism 220 communicates the TCP options(s) to a secure proxy process 210. In some embodiments, the network packet capture mechanism 220 communicates the TCP option(s) via UDP control packets to the secure access proxy 210. In one embodiment, the network packet capture mechanism 220 communicates to the secure access proxy 210 via a port listened on local host by the secure access proxy 210. The network packet capture mechanism 220 may communicate control information or data, such as via a control packet structure having information to identify the presence and length of the optionally included TCP header options. In one embodiment, the control packet includes the variable bytes of TCP header options.

At step 325, the secure access proxy 210 adds the received TCP header options from the control packet to a connect request message sent to the appliance 205. In one embodiment, the secure access proxy 210 sends a connect request to the appliance via an application layer protocol. As such, in some embodiments, the application's intercepted TCP connection request is transmitted to the appliance via an application layer protocol. For example, in one embodiment, the secure access proxy 210 sends an HTTP based CONNECT message to the appliance 205 and the CONNECT message identifies the TCP header options as parameters in the HTTP message.

At step 330, the appliance 205 transmits a response to the CONNECT message sent by the secure access proxy 210. In one embodiment, the appliance 205 transmits a standard HTTP response "200 OK" if the appliance 205 establishes a transport layer connection with the server requested by the application on the client. In another embodiment, the appliance 205 transmits an error message if the appliance is not able to establish a transport layer connection with the server requested by the application on the client. In the case of an error the end to end connection may be terminated, e.g., the local user application will report connection failure. In the case of a successful connection, the appliance 205 may transmit the additional TCP header options added by an appliance 205 or server 106 from the remote end of the connection. For example, the appliance 205 may add TCP options to the TCP SYN-ACK packets as discussed above in connection with FIGS. 2B-2D.

At step 335, the secure access proxy 210 receives TCP options from the response from the appliance 205. In some embodiments, the secure access proxy 210 stores these TCP options in storage or memory of the client 102. In one embodiment, the secure access proxy 210 stores these TCP options in a table, such as filter table, in association with the TCP session. For example, the secure access proxy 210 stores TCP options in association with any combination of source IP address, source port, destination IP address and destination port. In another example, the secure access proxy 210 stores TCP options in context with the TCP session or with a TCP session identifier. In yet another example, the secure access proxy 210 stores TCP options in association with an application identifier or process id. In one embodiment, secure access proxy 210 copies these TCP options from the user space of the secure access proxy 210 to the kernel. In some embodiments, the secure access proxy 210 transmits the TCP options received from the appliance 205 to the network packet capture mechanism 220.

At step 340, in some embodiments, the secure access proxy 210 indicates to the network packet capture mechanism 220 the requested transport layer connection of the application has been established. In some embodiments, the secure access proxy 210 communicates a control message via a UDP connection to the network packet capture mechanism 220. In one embodiment, the control message identifies to the network packet capture mechanism 220 the port listened to by the secure access proxy 210 is ready for communicating over the established transport layer connection. The secure access proxy 220 may communicate control information or data, such as via a control packet structure having information to identify the presence and length of the optionally included TCP header options. In one embodiment, the control packet includes the variable bytes of TCP header options. In some embodiments, this message informs the network packet capture mechanism 220 that the connection to the remote endpoint is established and that it can release the previously captured TCP-SYN. In one embodiment, the SYN message is redirected to the secure access proxy 220, but will not be released until the network packet capture mechanism 220, or driver, has stored the remote TCP SYN-ACK options for further processing. Once released, the driver waits for the local TCP SYN-ACK from the access secure proxy 210.

At step 345, the secure access proxy 210 responds to the application's transport layer connection request. In one embodiment, the secure access proxy 210 generates or otherwise provides a network packet on the network stack 208 having a response to the transport layer connection request, such as a SYN-ACK. In other embodiments, the network packet capture mechanism 220 responds to the application's transport layer connection request with a SYN-ACK. In yet another embodiment, the secure access proxy 210 or network packet capture mechanism 220 responds to the application's transport layer connection request with an error message.

At step 350, in one embodiment, once the secure access proxy 210 responds to the application's TCP SYN with a local TCP SYN-ACK message, the network packet capture mechanism 220 looks in storage or memory, such as in a filter table, to determine if a remote TCP SYN-ACK option has been stored for this TCP session. For example, the network packet capture mechanism 220 may have stored remote TCP options from a previous control message as described above at step 335. In one embodiment, if there is a remote SYN-ACK option associated with this TCP connection, the network packet capture mechanism 220 adds, attaches or otherwise provides the options to the local SYN-ACK packet prior to releasing the packet to the local user application. In one embodiment, the network packet capture mechanism 220 appends a predetermined maximum of bytes—sometimes 32-bit aligned—of TCP header options to the local SYN-ACK packet.

In some embodiments, the adding of remote TCP options to any TCP options already in the TCP header would exceed the maximum number of options or maximum byte size of the TCP options. In these embodiments, the network packet capture mechanism 220 may append the remote TCP options to the difference of the existing options and the maximum number of bytes. In some embodiments, the network packet capture mechanism 220 may give precedence to well known TCP options of standard TCP headers over proprietary unknown TCP options. In other embodiments, the network packet capture mechanism 220 may override any portion of the TCP options with any portion, or all of the remote TCP options.

Figure 4A:
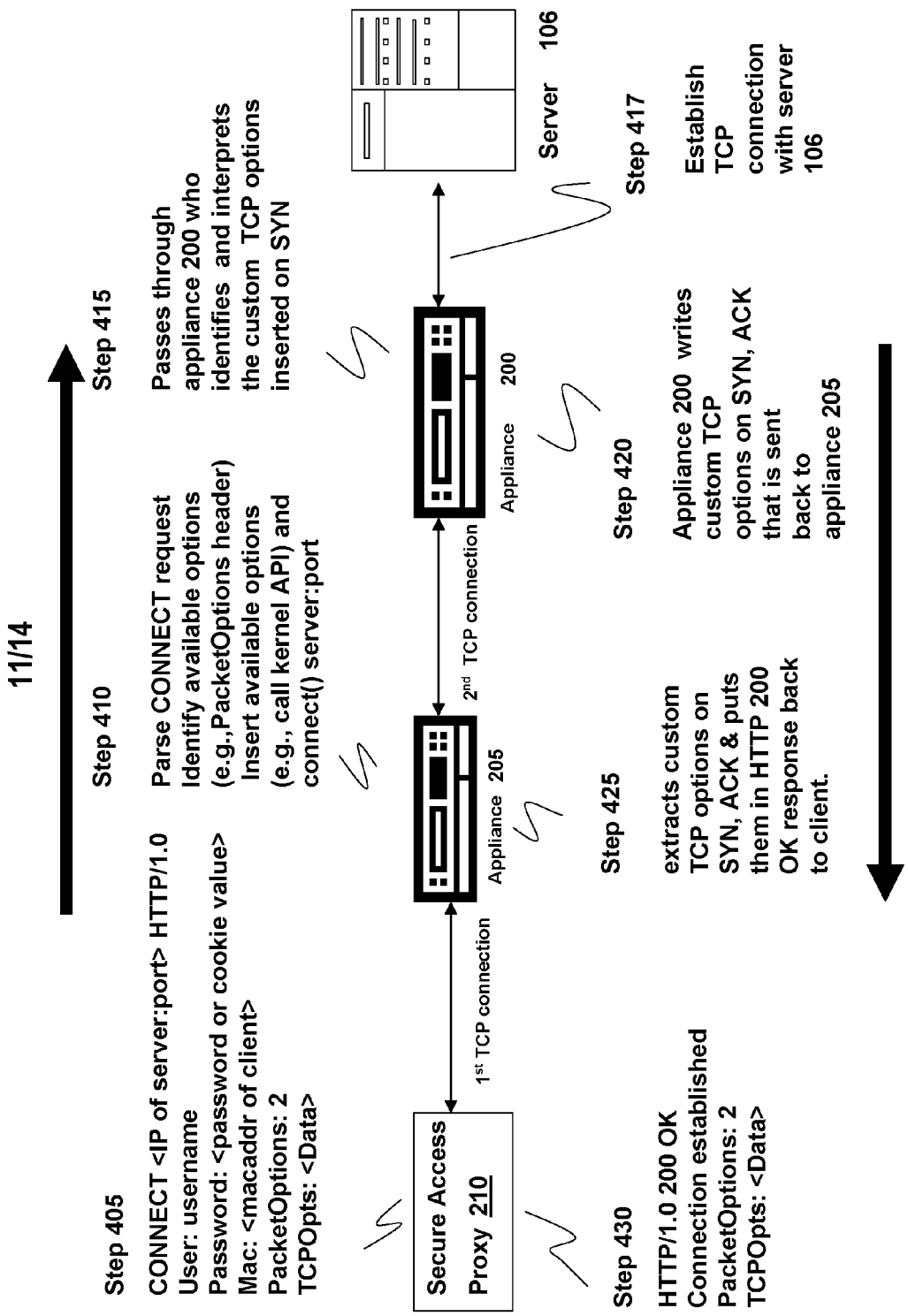
FIG. 4A is a block diagram of an embodiment of a system for processing communications between a client and a server via a first and second appliance.
Figure 4B:
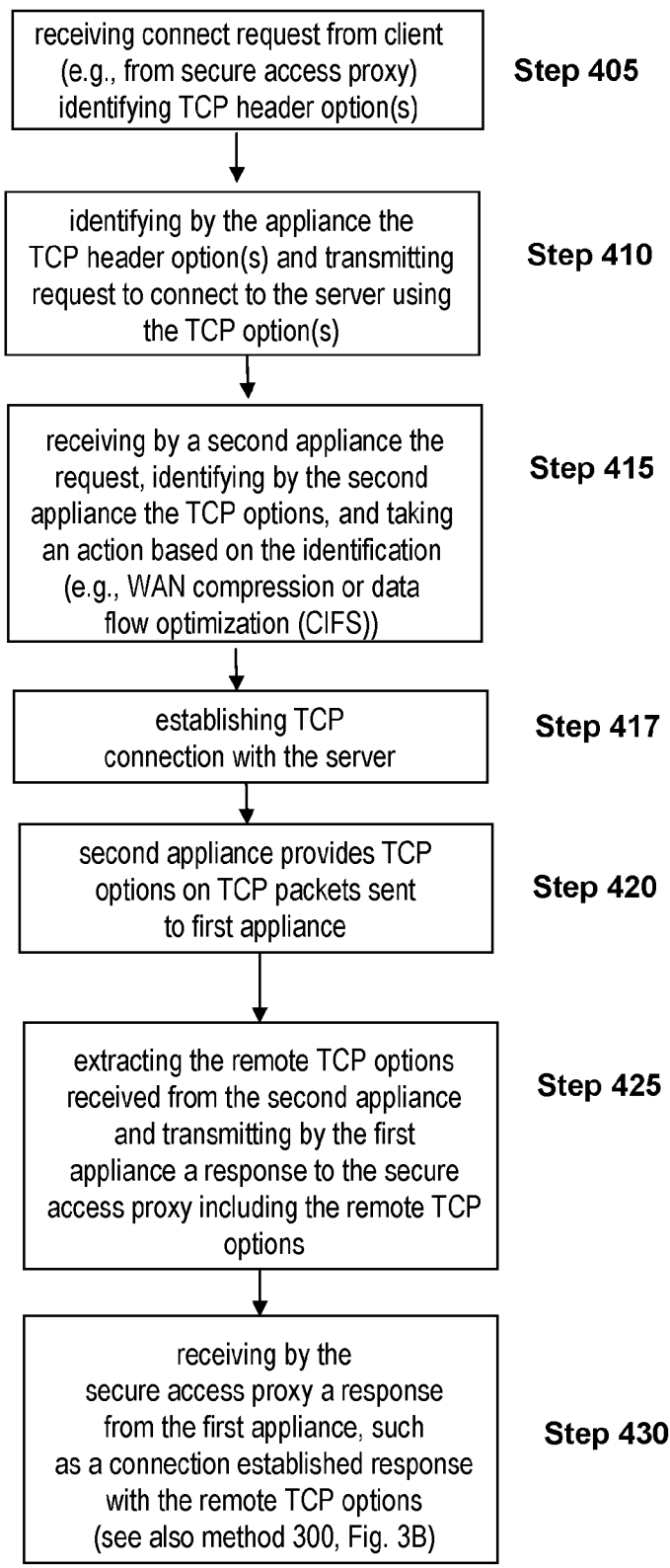
FIG. 4B is a flow diagram depicting steps of an embodiment of a method for practicing a technique for preserving a TCP option by an appliance in accordance with the embodiment of FIG. 4A.

Referring now to FIGS. 4A and 4B, a technique for preserving transport layer options via an appliance 205 terminating a transport layer connection with a client or server is depicted. In some embodiments, the appliance 205 terminates a first transport layer connection with the client 102 and establishes a second transport layer connection with a server 106. In other embodiments, the appliance 205 terminates a first transport layer connection with the server 106 and establishes a second transport layer connection with a client 102. An embodiment of method 400 of FIG. 4B will be discussed in conjunction with the embodiment of the system and environment illustrated in FIG. 4A.

In brief overview of method 400, at step 405, the appliance 205 receives a first connection request from the client 102, such as via the secure access proxy 120. At step 410, the appliance 205 identifies the TCP header option(s) in the connection request and transmits a second connection request to the server 106 using the identified TCP header option(s). At step 415, a second appliance 200 receives or intercepts the second connection request and identifies the TCP header option(s) in the request. Upon identifying the TCP header option(s), the second appliance 200 may take an action, such as WAN/LAN port detection or perform a WAN optimization technique, such as compression or data flow optimization. At step 417, the TCP connection is established with the server 106. At step 420, the second appliance 200 intercepts or receives the server's response to the connection request, such as TCP SYN-ACK packet, and adds TCP options to the packet. The second appliance 200 forwards this tagged SYN-ACK packet to the client via the first appliance 205. At step 425, the first appliance 205 extracts the remote TCP options received from the second appliance 200 and transmits a response to the client 102 including the remote TCP options. At step 430, the client 102, such as via the secure access proxy 210, receives the response from the first appliance 205 including the remote TCP options. For example, the client 102 receives a connection established response identifying the remote TCP options provided by the second appliance 200.

In further details, at step 405, the appliance 205 intercepts or otherwise receives a request transmitted by the client 102 to establish a transport layer connection with a server 106. In some embodiments, the appliance 205 receives the request via a first transport layer connection with the client 102 or secure access proxy. In another embodiment, the appliance 205 receives the connection request as the end point of a transport layer connection with the client 102 or secure access proxy 210. In one embodiment, the secure access proxy 210 transmits the connection request. In another embodiment, the client agent 120, or any portion thereof, transmits the connection request. In other embodiments, the client transmits the request via an application layer protocol over a TCP or UDP connection already established between the client 102 and the appliance 205. In other embodiments, the appliance 205 receives a first message from the client 102 having the connect request and a second message from the client identifying the TCP option(s).

In one embodiment, the secure access proxy 210 transmits an HTTP type command or message to the appliance 205. As illustrated in FIG. 4A, for example, the secure access proxy 210 may transmit a CONNECT message to the appliance 205 identifying one or more of the following in association with the request: version of HTTP, username, password or cookie value, and Machine Access Control (MAC) address of the client. In some embodiments, the CONNECT message identifies TCP options and the data contents thereof to the appliance 205. For example, the secure access proxy 210 may transmit any TCP options established by the network filter 215 and identified by network packet capture mechanism 220 as described above in connection with FIGS. 3A and 3B.

At step 410, the appliance 205 identifies the TCP header option(s) in the connection request. In one embodiment, the appliance 205 receives the CONNECT message of the secure access proxy 210 and identifies, reads or parses the message to determine the TCP options attached to or available in the message. In some embodiments, the appliance 205 makes an application programming interface (API) call to obtain the TCP options received with the message.

In other embodiments, the appliance 205 transmits a second transport layer connection request to the server 106 using the identified TCP header option(s). In one embodiment, the appliance 205 generates a TCP connection request packet and adds, inserts, attaches or otherwise provides the TCP option(s) identified in the connection request from the client 102 to the generated packet. In some embodiments, the appliance 205 makes a kernel level application programming interface (API) call to provide the TCP options to the TCP header of the TCP connection request packet. In one embodiment, the appliance 205 generates a TCP connection request packet or otherwise a transport layer connection request using the IP address and port of the server identifying in the connection message from the secure access proxy 210.

At step 415, the appliance 205 transmits a transport layer connection request to the server 106 that traverses appliance 200, for example, a SYN network packet for a TCP connection request. In some embodiments, the appliance 200 intercepts or otherwise receives the connection request of the appliance 205. In one embodiment, the appliance 200 identifies the TCP option(s) in the TCP connection request. In another embodiment, the appliance 200 determines that the TCP connection request network packet, or SYN packet, includes TCP option(s) in the TCP header. In response to the detection or identification of the TCP option(s), the appliance 200 may perform any of the techniques described herein for automatic WAN/LAN port detection, the detection of the presence, capability or function of another appliance or device on the network 104, or to configure itself to perform WAN based acceleration or optimization techniques.

At step 420, the server 106 responds to the transport layer connection request of the appliance 205. In some embodiments, the server 106 transmits a SYN-ACK network packet in response to the SYN network packet transmitted by the appliance 205. In one embodiment, the server 106 is accepting the transport layer connection request. In another embodiments, the server 106 establishes the transport layer connection request and transmits an acknowledgment of the establishment. In some embodiments, the server 106 refuses, rejects or otherwise does not accept the transport layer connection request. The response by the server 106 may traverse the appliance 200.

In some embodiments, the appliance 200 intercepts or otherwise receives the server's response to the connection request. In one embodiment, the appliance 200 intercepts or otherwise receives a TCP SYN-ACK packet transmitted by the server. In some embodiments, the appliance 200 adds, attaches, inserts or otherwise provides TCP option(s) to the intercepts SYN-ACK packet. The appliance 200 may provide or establish TCP option(s) to the SYN-ACK packet to announce the presence, capability or function of the appliance 200, for example, as discussed above in conjunction with FIGS. 2B-2D. In one embodiment, the appliance 200 forwards the intercepted SYN-ACK packet to appliance 205 In another embodiment, the appliance 200 transmits the intercepted SYN-ACK packet to the client 102 and the transmission traverses appliance 205.

At step 425, the appliance 205 receives or intercepts the SYN-ACK packet forwarded or transmitted by appliance 200. In some embodiments, the appliance 205 identifies or determines that TCP option(s) are included in the SYN-ACK packet. In one embodiment, the appliance 205 identifies these TCP option(s) as remote TCP option(s) of an appliance 200 or another device 100. In another embodiment, the appliance 205 identifies or determines these TCP option(s) are custom or proprietary options established by another appliance 200 or device 100. For example, in one embodiment, the appliance 205 identifies or determines the TCP option(s) have an option identifier within or above a predetermined range, such as greater than option id 26.

The appliance 205 extracts, parses or otherwise reads the TCP option(s) from the SYN-ACK packet and provides the TCP option(s), or any portion thereof, in a message transmitted to the client 102. In one embodiment, the appliance 205 generates an HTTP 200 OK message in response to the client's CONNECT message transmitted at step 405. In some embodiments, the appliance 205 generates an error response to the client's CONNECT message transmitted at step 405. In one embodiment, the appliance 205 transmits one or more messages identifying the connection has been established and the remote TCP option(s), if any, via an application layer protocol over an established transport layer connection, e.g., the first terminated transported layer connection between the appliance 205 and client 102.

At step 430, the client 102, such as via the secure access proxy 210, receives the response via one or more messages from the first appliance 20. In one embodiment, the secure access proxy 210 receives a successful connection establishment message and a message identifying the remote TCP option(s). For example, as illustrated in FIG. 4A, the client 102 may receive an HTTP 200 OK connection established message and one or more parameters identifying the number of TCP option(s) and the data content thereof. In one embodiment, the response may include no remote TCP option(s), one TCP option, or multiple TCP option(s). The data portion of the message may identify the option id(s), if any, and the value of the TCP option(s), if any. In response to receiving a connection request response and any remote TCP option(s), the client agent 120 of the client 102 may perform any of the steps of the embodiment of method 300 described above.

Although an embodiment of method 400 is generally described above in view of a single transport protocol layer terminating appliance 205, the techniques illustrated by method 400 may be deployed in a plurality of transport protocol layer terminating appliances 205, 205 in the network path between a client and a server. Each of the plurality of appliances 205 may preserve the TCP option(s) communicated between the appliance 200 or server 106.

In view of the client TCP option preservation techniques described in FIGS. 3A-3B and the appliance TCP option preservation techniques described in FIGS. 4A-4B, these techniques may operate in conjunction to provide an end-to-end TCP option preservation solution. Although these techniques are described in an embodiment of a client and an appliance using TCP option(s), these techniques may also be deployed between a client and a server, a server and an appliance, or between a plurality of appliances that have network paths traversing one or more transport protocol layer terminating devices.

E. IP Options for the Detection of Presence, Function or Capability Between Devices Referring now to FIGS. 5A and 5B, an embodiment of a system and method for using internet protocol (IP) header options of an IP datagram for detecting presence, function or capability between devices is depicted. In some embodiments, the technique of encoding IP header options allows device or appliances to have a signaling or communication scheme that traverses firewall or transport layer terminating devices. The encoding of the IP header options may be transparent to equipment in the network path of communications between the appliances.

Figure 5A:
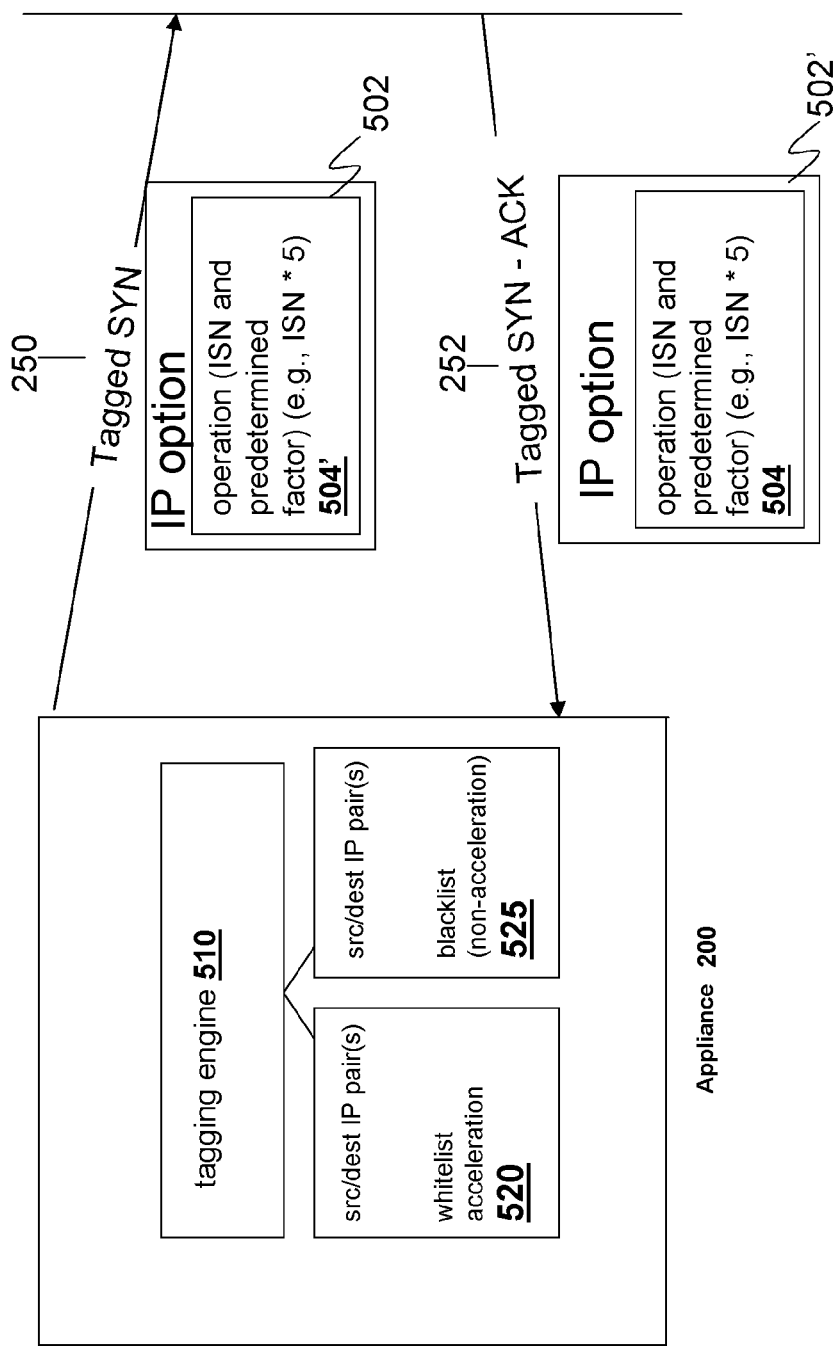
FIG. 5A is a block diagram of an embodiment of a system for using an internet protocol option field to announce and detect announcement of a presence of a device in a network environment.

FIG. 5A illustrates another embodiment of the appliance 200 in view of the system and methods described in conjunction with FIG. 2B. In brief overview, the appliance 200 includes a tagging engine 510, a whitelist 520 and a blacklist 525. The tagging engine 510 includes software, hardware or any combination of software and hardware. The tagging engine 510 may include an application, program, library, process, service, task, thread or any type and form of executable instructions for performing any of the TCP and/or IP options tagging techniques and operations described herein. In one embodiment, the tagging engine 510 operates in kernel mode. In other embodiments, the tagging engine 510 operates in user mode. In some embodiments, a first portion of the tagging engine 510 operates in kernel mode while a second portion of the ragging engine operates in user mode.

The tagging engine 510 may include functions, operations or logic to insert, add, attach, modify, provide or otherwise establish a tagged packet 250 or 252. In one embodiment, the tagging engine 510 tags a packet, such as SYN packet 250 or SYN-ACK packet 252, with a TCP option. In another embodiment, the tagging engine 510 tags a packet, such as SYN packet 250 or SYN-ACK packet 252, with an IP option as will described in further detail below. In some embodiments, the tagging engine 510 includes functions, operations or logic, such as a comparator, for comparing a TCP option and/or IP option to a stored value or otherwise an expected value. In other embodiments, the comparator of the tagging engine 510 determines if a TCP option and/or IP option has a valid, applicable or otherwise useable value.

In one embodiment, the tagging engine 510 encodes, sets or otherwise establishes a value of the IP option field 504 of an IP header. The encoding of the IP option field in accordance with the operations discussed herein may also be referred to as "tagging". In one embodiment, the tagging engine 510 intercepts a network packet at the network or IP layer of the network stack 208. In other embodiments, the tagging engine 510 intercepts a network packet at the transport layer of the network stack 208. In yet another embodiment, another application, program, service, process, task, thread or set of executable instructions of the appliance 200 intercepts the network packet at any layer of the network stack 208, and provides the intercepted network packet to the tagging engine 510.

In some embodiments, the tagging engine 510 encodes an IP option 502 for a SYN packet 250 and/or for a SYN-ACK packet 252 as illustrated in FIG. 5A. In one embodiment, the tagging engine 510 encodes the IP option 502 based on an operation, algorithm or function using an initial sequence number identified in the SYN or SYN-ACK packet and a predetermined factor. In some embodiments, the tagging engine 510 encodes the IP option 502 based on a value of the initial sequence number and predetermined integer value, such as 2, 3, 4 or 5. In some embodiments, the tagging engine 510 performs any type and form of mathematical operation on the initial sequence number using a predetermined factor. As such, in one embodiment, the tagging engine 510 performs addition, subtraction, multiple, division, or any combination thereof, to derive a value from the initial sequence number and the predetermined factor. In another embodiment, the tagging engine 510 performs any type and form of hashing or encryption of the IP 502 based on a predetermined factor. In some embodiments, the tagging engine 510 determines the initial sequence number requested by a client or server is 0 or a predetermined value the appliance 200 does not want to use, and the tagging engine 510 sets the ISN to a predetermined value the appliance 200 would like to use, such as 1234. In yet other embodiments, the tagging engine 510 may encode, set or establish the IP option 502 with any suitable or desired values, such as a parameter for WAN optimization, compression or data flow acceleration or data to be communicated between appliances.

In some embodiments, the tagging engine 510 monitors network packets. In one embodiment, the tagging engine 510 monitors SYN and SYN-ACK packets of a TCP connection handshake to determine if a connection is successfully established. In one embodiment, the tagging engine 510 monitors the number of retries of a transport connection request between a source and destination, such as a client 102 and server 106. In some embodiments, the tagging engine 510 monitors the setting of TCP option(s) and/or IP option(s) between a source and destination. In one embodiment, the tagging engine 510 monitors the setting of custom or proprietary TCP option(s) and/or IP option(s). In other embodiments, the tagging engine 510 monitors errors, corruption or invalidity of TCP option(s) and/or IP option(s) in network packets transmitted between a source and destination.

In some embodiments, the tagging engine 510 may store source and destination information in a whitelist 520 and/or blacklist 525 in response to monitoring of network packets. In one embodiment, the whitelist 520 identifies source and/or destinations the appliance determines to accelerate. In another embodiment, the whitelist 520 identifies source and/or destinations for which the TCP option(s) and/or IP option (s) techniques have been successfully used. In yet another embodiment, any source and destination pair not in the whitelist 520 is implied to be on a blacklist 525, whether or not a blacklist 525 is used by the tagging engine 510. In some embodiments, the appliance 200 uses only a whitelist 520. In other embodiments, the blacklist 525 identifies source and/or destinations the appliance determines not to accelerate. In one embodiment, the blacklist 525 identifies source and/or destinations for which the TCP option(s) and/or IP option(s) techniques have not been successfully used.

The whitelist 520 and blacklist 525 includes software, hardware or any combination of software and hardware. In some embodiments, the whitelist 520 and blacklist 525 include an object, data structure, database, file or any other type and form of element for storing a list of source and destination pairs. In one embodiment, the tagging engine 510 stores information or data identifying source and destination internet protocol address and port pairs. In some embodiments, the tagging engine 510 stores an enumerated list of source and destination pairs to the whitelist 520 and/or blacklist 525.

In one embodiment, the tagging engine 510 determines from monitoring network packets that a source and destination have successfully established a transport layer connection while using TCP option(s) and/or IP option(s) in the SYN and SYN-ACK packets described herein. In response to the determination, the tagging engine 510 stores to the whitelist 520 information of the source and destination pair for the connection, such as source and destination IP addresses and port. In one embodiment and in response to the determination, the tagging engine 510 removes the source and destination pair information from the blacklist 525. In some embodiments and in response to the determination, the tagging engine 510 moves the source and destination pair information from the blacklist 525 to the whitelist 520.

In another embodiment, the tagging engine 510 determines from monitoring network packets that a source and destination have not successfully established a transport layer connection. In some embodiments, the tagging engine 510 determines from monitoring network packets that the number of retries to establish a transport layer connection between a source and destination has exceeded a predetermined threshold, such as 2 or 3 retries. In response to the determination, the tagging engine 510 stores to the blacklist 520 information of the source and destination pair used in attempting to establish the connection, such as source and destination IP addresses and port. In another embodiment, in response to the determination, the tagging engine 510 does not use a blacklist 525 but instead does not store any information about the source and destination pair to the whitelist 520. In yet another embodiment, the tagging engine 510 moves a source and destination pair from the blacklist 525 to the whitelist 520.

Figure 5B:
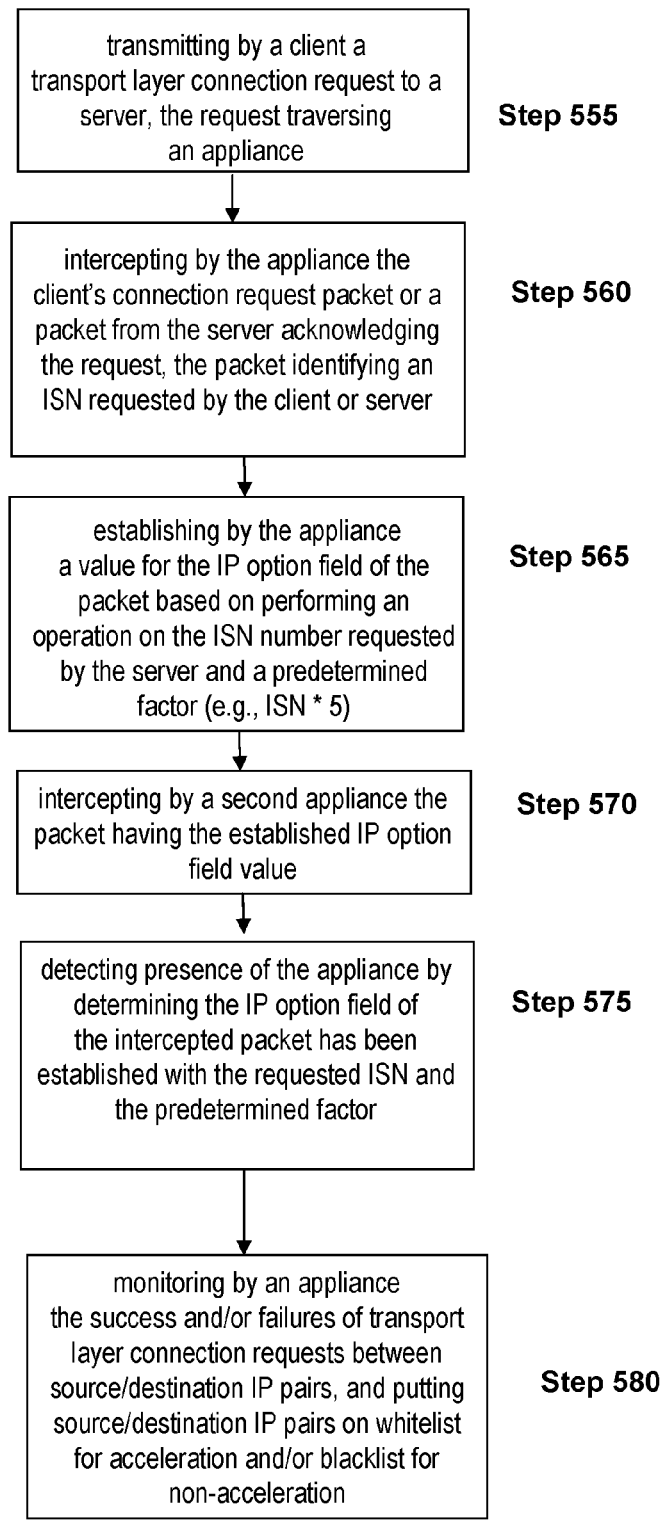
FIG. 5B is a flow diagram depicting steps of an embodiment of a method for practicing a technique for using internet protocol option fields in accordance with the embodiment of FIG. 5A.

Referring now to FIG. 5B, an embodiment of steps of a method 550 are depicted for using an IP option(s) technique. In brief overview, at step 555, a client 102 transmits a transport layer connection request to a server 106. The request traverses an appliance 200. At step 560, the appliance 200 intercepts a packet from the server 106 acknowledging the connection request, the network packet identifies an initial sequence number (ISN). At step 565, the appliance 200 establishes a value for the IP option field 504 of the packet based on the ISN number requested by the server 106 and a predetermined factors, such as ISN*5. At step 570, a second appliance 200' or client 102 intercepts or receives the packet having the established IP option value. At step 575, the second appliance 200' or client 102 detects the presence, capability or function of the appliance 200 by determining the IP option 504 has been set to the ISN requested by the server and the predetermined factor. At step 580, the client 102 or appliance 200 monitors the success and/or failures of transport layer connection requests between source and destination pairs, and stores to a whitelist 520 and/or blacklist 525 according to the success or failure of the connection.

In further details, at step 555, a client 102 requests a transport layer connection with a server 106. In another embodiment, the server 106 requests a transport layer connection with the client 102. In some embodiments, the transport layer connection request traverses a first appliance 200. In other embodiments, a first appliance 200 intercepts the transport layer connection and forwards the request to the server 106 via a second appliance 200'. In yet another embodiment, the transport layer connection request traverses multiple appliances 200, 200' via a transport control protocol terminating device 205. In some embodiments, the client 102 or appliance 200 tags a TCP connection request, or SYN packet 250, using TCP option(s) as described herein. In other embodiments, the client 102 or appliance 200 tags a TCP connection response, or SYN-ACK packet 252, using TCP option(s) as also described herein.

At step 560, an appliance 200 intercepts or otherwise receives the client's connection request. In one embodiment, the appliance 200 identifies or determines the initial sequence number o requested by the client 102 in establishing the connection. In some embodiments, the appliance 200 identifies or determines the ISN of a SYN packet 250 transmitted by the client 102. In another embodiment, the appliance 200 intercepts or otherwise receives a response to the transport layer connection request from the server 106. In one embodiment, the appliance 205 identifies or determines from the server's response the initial sequence number requested by the server 106 in establishing the connection. In some embodiments, the appliance 205 identifies or determines the ISN of a SYN-ACK packet 252 transmitted by the server 106.

At step 565, the appliance 200 encodes or otherwise establishes a value for the IP option field 504 of the intercepted packet. In some embodiments, the appliance 200 encodes the IP option 504 with the ISN number multiplied by a predetermined factor, such as 5. As described above, the appliance 200 may encode the IP option using any mathematical operation or algorithm based on the ISN and a predetermined factor. In one embodiment, the appliance 200 encodes the IP option 504 with the ISN requested by the client 102. In another embodiment, the appliance 200 encodes the IP option 504 with the ISN requested by the server 106. In some embodiments, the appliance 200 determines the ISN is set to 0 or another predetermined value, and instead of using the ISN requested by the client or server, the appliance 200 sets the ISN for encoding the IP option 200 to a second predetermined value, such as 1234.

At step 570, an appliance 200' intercepts a request or a response having the encoded IP option 504, 504'. In one embodiment, a second appliance 200' intercepts a client's TCP connection request, SYN packet 250, forwarded by a first appliance 200. In another embodiment, a first appliance 200 intercepts a server's acknowledgment of the TCP connection, SYN-ACK packet 252 forwarded by a second appliance 200'. In yet other embodiments, a client 102 or a server 106 may process the IP option(s) of the SYN and/or SYN-ACK packets in accordance with the techniques and operations described herein. In still another embodiment, the appliance 205 may intercept and process these encoded IP option (s) 504.

At step 575, an appliance 200 detects a presence of another appliance 200' by determining the IP option 504 has been encoded using a predetermined value. In some embodiments, the appliance 200, 200' identifies, tracks or stores the ISN of SYN and SYN-ACK packets to compare with the ISN calculated from the IP option 504. For example, the appliance 200 can divide the value of the ISN number in the IP option 504 by the predetermined factor, e.g., 5 to determine if the ISN numbers match. In one embodiment, the appliance 200 determines the IP option 504 is encoded with an ISN requested by the client 102 and a predetermined factor, such as integer value 5. In another embodiment, the appliance 200 determines the IP option 504 is encoded with an ISN requested by the server 106 and a predetermined factor. In some embodiments, the appliance 200 determines the IP option 504 has a hash or encryption of an ISN and a predetermined number. In yet other embodiments, the appliance 200 determines the IP option 504 is encoded with or set to a value expected or otherwise pre-negotiated between appliances 200, 205. The appliances 200, 200' may use the detection of the IP option 504 to announce presence, capability or function of another appliance or device, automatic WAN/LAN port detection, or to pass or exchange parameters between appliances.

At step 580, an appliance 200 or tagging engine 510 monitors the success, retries, and failures of transport layer connection requests between source and destination pairs, such as clients and servers. For example, the appliance 200 may monitor the SYN and SYN-ACK packets between a client and a server. In response to monitoring, the appliance 200 stores source and destination pair information in the whitelist 520 and/or blacklist 525. In one embodiment, upon either a successful TCP connection or detection of a TCP or IP based option announcement, the appliance 200 places the source and destination pair on the whitelist 520, removes the pairs from the blacklist 525, or both. In another embodiment, upon either a failed TCP connection, too many retries or detection of a failed TCP or IP based option announcement, the appliance 200 places the source and destination pair on the blacklist 525, removes the pairs from the whitelist 520, or both.

In one embodiment, the appliance 200 places each source and destination pair in the whitelist 520 by default before monitoring transport layer connection requests between the source and destination pair. That is, in some embodiments, the initial state of connection is associated with the whitelist 420. Accordingly, the appliance 200 may accelerate the connection of the source and destination pair. In another embodiment, the appliance 200 places each source and destination pair in the blacklist 525 by default before monitoring transport layer connection requests between the source and destination pair. That is, in some embodiments, the initial state of connection is associated with the blacklist. The appliance 200 may not accelerate the connection until a successful transport layer connection is established and the source and destination pair placed on the whitelist 520. In another embodiment, the appliance 200 places the source and destination pair on the blacklist 525 until a successful announcement using the TCP options or IP Options is detected by the appliance 200. In some embodiments, the appliance 200 uses or establishes only a whitelist 520, and source and destination pairs are place or removed from the whitelist 520 according to the success or failures of connection requests and/or announcements with TCP options or IP options.

In yet another embodiment, the appliance 200 may identify those source and destination pairs that may likely be accelerated or have effective acceleration. In these embodiments, the appliance 200 may store those source and destination pairs to the whitelist 520 by default or otherwise. In some embodiments, the appliance 200 may identify those source and destination pairs that are unlikely to be accelerated or have ineffective acceleration. In these embodiments, the appliance may store those source and destination pairs to the blacklist 525 by default or otherwise.

Although an embodiment of method 550 is generally described above as a first appliance encoding an IP option and a second appliance detecting the encoded IP option, the encoding IP option technique may be used between a client and an appliance, a server and an appliance or a client and a server. Furthermore, although generally described for detecting a presence or capability of an appliance in a network path, the IP option(s), may be used for or considered to be a subchannel, virtual channel or low-bandwidth sub carrier of communications that is transparent to intervening network equipments.

Although an embodiment of method 550 is described using IP options for announcing a presence, function or capability between devices or appliances, the IP options techniques of FIGS. 5A and 5B can be used in combination or conjunction with the TCP options techniques described with FIGS. 2B-2D. In one embodiment, the appliance 200 may first use TCP options to announce presence, functionality or capability to another appliance, and if it does not work, the appliance may then use the IP Option technique instead. In another embodiment, an appliance may communicate with another appliance using both TCP options and IP option techniques as described herein. The TCP option(s) may be used to announce presence of a first type of appliance, function or capability, and the IP option(s) to announce presence of a second type of appliance, function or capability. In yet another embodiment, the appliance may use TCP option(s) to communicate a first set or type of parameters and IP option(s) to communicate a second or type of parameters.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed:

1. A method for maintaining by a transport control protocol terminating appliance a header option of a transport control protocol connection request communicated between a client and a server via the transport control protocol terminating appliance and a second appliance, and identifying by the second appliance via the header option a type of network connection of a port of the second appliance, the method comprising the steps of:

(a) receiving, by a first appliance, a first request from a client to establish a transport control protocol connection to a server, the first request identifying a transport control protocol header option, the first appliance terminating a first transport protocol control connection with the client;

(b) identifying, by the first appliance, a transport control protocol header option of the first request;

(c) transmitting, by the first appliance in response to the first request, a second request to establish the transport control connection to the server, the first appliance providing in the second request the identified transport control protocol header option of the first request;

(d) identifying, by a second appliance, the transport control header option of the second request received on a port of the second appliance; and (e) determining, by the second appliance, a type of network connection of the port in response to identifying the transport control header option.

2. The method of claim 1, wherein step (e) comprises determining, by the second appliance, the port is connected to a Wide Area Network (WAN).

3. The method of claim 1, wherein step (e) comprises determining, by the second appliance, the port is connected to one of a client or a third appliance providing one or more Wide Area Network (WAN) optimization techniques.

4. The method of claim 1, comprising processing, by the second appliance, network packets communicated via the port based on the identified type of network connection.

5. The method of claim 4, comprising applying, by the second appliance, a Wide Area Network (WAN) optimization operation on the network packets.

6. The method of claim 1, comprising identifying, by the second appliance, via the transport control protocol option that the client is configured to perform one of compression or data flow acceleration.

7. The method of claim 1, comprising transmitting, by the second appliance, the second request to the server.

8. The method of claim 7, comprising establishing, by the server, a second transport control protocol connection in response to receiving the second request.

9. The method of claim 1, wherein step (a) comprising transmitting, by the client, the first request via an application layer protocol.

10. The method of claim 1, comprising intercepting, by a network capture mechanism of the client, the transport control protocol connection request of an application, the transport control connection request having the transport protocol control header option.

11. The method of claim 10, comprising transmitting, by the network capture mechanism, a request to an agent of the client to establish the transport control protocol connection with the server.

12. The method of claim 11, comprising transmitting, by the agent, the first request to the appliance.

13. The method of claim 1, comprising intercepting, by a network filter, on the client a network packet comprising a transport control protocol connection request of the application, and inserting the transport control protocol header option into the network packet.

14. The method of claim 1, comprising transmitting, by the second appliance, to the first appliance a second transport control protocol header option in response to establishing the second transport control protocol connection.

15. The method of claim 14, comprising extracting, by the first appliance, the second transport control protocol header option and transmitting the second transport control protocol header option to the client in response to the client's request to establish the transport control protocol connection with the server.

16. The method of claim 1, wherein the first appliance comprises one of the following: an application firewall, a Secure Socket Layer Virtual Private Network device, a network acceleration device or application acceleration device.

17. The method of claim 1, wherein the second appliance comprises one of a Wide Area Network optimization controller or a Wide Area Network acceleration device.

18. A method for maintaining by a client a header option of a transport control protocol connection request communicated from a client to a server via a transport control protocol terminating appliance, the method comprising the steps of:

(a) intercepting, by a network packet capture mechanism on a client, a first network packet of an application requesting to establish a transport control protocol connection to a server, the first network packet comprising a first transport control protocol header option;

(b) communicating, by the network packet capture mechanism, the first transport control protocol header option to a secure access proxy on the client;

(c) transmitting, by the secure access proxy, to an appliance a request to connect to the server, the request identifying the first transport control protocol header option, the appliance terminating a first transport control protocol connection with the client; and (d) storing, by the secure access proxy, a second transport control protocol header option received from the appliance in establishing a second transport control protocol connection with the server; and (e) providing, by the network packet capture mechanism, to the application a second network packet comprising a response to the application's request to establish the transport control protocol connection to a server, the second network packet comprising the second transport control protocol header option.

19. The method of claim 18, comprising intercepting, by a network filter, the first network packet of the application, and adding the first transport control protocol header option to the network packet.

20. The method of claim 18, comprising transmitting, by the client, the first transport control protocol header option to identify that the client is connecting to the server via a Wide Area Network (WAN) connection.

21. The method of claim 18, comprising transmitting, by the client, the first transport control protocol header option to announce presence of the client to a Wide Area Network (WAN) appliance.

22. The method of claim 18, comprising transmitting, by the client, the first transport control protocol header option to identify to a Wide Area Network (WAN) appliance that the client is configured to provide compression or data flow acceleration.

23. The method of claim 18, wherein step (c) comprises transmitting, by the secure access proxy, the request to connect to the server via an application layer protocol.

24. The method of claim 18, wherein step (b) comprises communicating, by the network packet capture mechanism, to the secure access gateway via a user datagram protocol.

25. The method of claim 18, comprising listening, by the secure access gateway, on a local user datagram protocol port for communications from the network packet capture mechanism.

26. The method of claim 18, comprising storing, by the network packet capture mechanism, the first transport control protocol header option in a storage element.

27. The method of claim 18, comprising operating, by the network packet capture mechanism, in a kernel portion of an operating system of the client.

28. The method of claim 18, comprising operating, by the secure access proxy, in a user space portion of an operating system of the client.

29. The method of claim 18, comprising providing by, one of the network packet capture mechanism, the secure access proxy or a network filter, one of a Wide Area Network compression or Wide Area Network data flow acceleration.

30. The method of claim 18, comprising transmitting, by the appliance, a second request to establish the transport control protocol connection with the server using the first transport control protocol header option, the second request traversing a second appliance.

31. The method of claim 30, comprising identifying, by a second appliance, via the first transport control protocol header option that a port of the second appliance used by the client is connected to a Wide Area Network (WAN).

32. The method of claim 31, comprising identifying, by the second appliance, via the first transport control protocol header option that the client includes a capability of one of compression or data flow acceleration.

33. The method of claim 31, comprising transmitting, by the second appliance, to the appliance the second transport control protocol header option in response to establishing the second transport control protocol connection to the server.

34. The method of claim 33, comprising extracting, by the appliance, the second transport control protocol header option, and transmitting the second transport control protocol header option to the client in response to the client's request to establish a transport control protocol connection with the server.

35. The method of claim 31, wherein the second appliance comprises one of a Wide Area Network optimization controller or a Wide Area Network acceleration device.

36. The method of claim 18, wherein the appliance comprises one of the following: an application firewall, a Secure Socket Layer Virtual Private Network device, a network acceleration device or application acceleration device.

37. A system for maintaining by a transport control protocol terminating appliance a header option of a transport control protocol connection request communicated between a client and a server via the transport control protocol terminating appliance and a second appliance, and the second appliance identifying via the header option a type of network connection of a port of the second appliance, the system comprising:
 a client transmitting a first request to establish a transport control protocol connection to a server, the first request identifying a transport control protocol header option;
 a first appliance receiving the first request from the client, the first appliance terminating a first transport protocol control connection with the client, the first appliance identifying the transport control protocol header option of the first request, and transmitting in response to the first request, to the server, a second request to establish the transport control connection using the identified transport control protocol header option, and
 a second appliance identifying the transport control header option of the second request received on a port of the second appliance, and determining a type of network connection of the port in response to identifying the transport control header option.

38. The system of claim 37, wherein the second appliance determines the port is connected to a Wide Area Network (WAN).

39. The system of claim 37, wherein the second appliance determines the port is connected to one of a client or a third appliance providing one or more Wide Area Network (WAN) optimization techniques.

40. The system of claim 37, wherein the second appliance processes network packets communicated via the port based on the identified type of network connection.

41. The system of claim 40, wherein the second appliance performs a Wide Area Network (WAN) optimization operation on the network packets.

42. The system of claim 37, wherein the second appliance determines via the transport control protocol option that the client includes a capability of one of compression or data flow acceleration.

43. The system of claim 37, wherein the client transmits the first request via an application layer protocol.

44. The system of claim 37, wherein a network capture mechanism of the client intercepts the transport control protocol connection request of an application, the transport control connection request having the transport protocol control header option.

45. The system of claim 44, wherein the network capture mechanism transmits a request to an agent of the client to establish the transport control protocol connection with the server.

46. The system of claim 37, wherein the agent transmits the first request to the appliance.

47. The system of claim 37, wherein a network filter intercepts on the client a network packet comprising a transport control protocol connection request of the application, and inserts the transport control protocol header option into the network packet.

48. The system of claim 37, wherein the second appliance transmits to the first appliance a second transport control protocol header option in establishing the second transport control protocol connection.

49. The system of claim 48, wherein the first appliance extracts the second transport control protocol header option and transmits the second transport control protocol header option to the client in response to the client's request to establish a transport control protocol connection with the server.

50. The system of claim 37, wherein the first appliance comprises one of the following: an application firewall, a Secure Socket Layer Virtual Private Network device, a network acceleration device or application acceleration device.

51. The system of claim 37, wherein the second appliance comprises one of a Wide Area Network optimization or a Wide Area Network acceleration device.

* * * * *